(12) United States Patent
Izu et al.

(10) Patent No.: US 12,466,164 B2
(45) Date of Patent: Nov. 11, 2025

(54) INTERMEDIATE FILM FOR LAMINATED GLASSES, LAMINATED GLASS, AND AUTOMOBILE

(71) Applicant: SEKISUI CHEMICAL CO., LTD., Osaka (JP)

(72) Inventors: Yasuyuki Izu, Roermond (NL); Masashi Yanai, Roermond (NL); Hiroaki Inui, Kouka (JP); Ruud Verheijen, Roermond (NL); Sho Fujioka, Kouka (JP); Maya Mitsuka Wakayama, Roermond (NL)

(73) Assignee: SEKISUI CHEMICAL CO., LTD., Osaka (JP)

( * ) Notice: Subject to any disclaimer, the term of this patent is extended or adjusted under 35 U.S.C. 154(b) by 1064 days.

(21) Appl. No.: 17/046,997

(22) PCT Filed: May 16, 2019

(86) PCT No.: PCT/JP2019/019442
§ 371 (c)(1),
(2) Date: Oct. 12, 2020

(87) PCT Pub. No.: WO2019/221218
PCT Pub. Date: Nov. 21, 2019

(65) Prior Publication Data
US 2021/0046738 A1 Feb. 18, 2021

(30) Foreign Application Priority Data
May 16, 2018 (JP) .................. 2018-094419

(51) Int. Cl.
*B32B 17/10* (2006.01)
*B60J 1/00* (2006.01)
(Continued)

(52) U.S. Cl.
CPC .... *B32B 17/10036* (2013.01); *B32B 17/1011* (2013.01); *B32B 17/10339* (2013.01);
(Continued)

(58) Field of Classification Search
CPC ........... B32B 17/10036; B32B 17/1011; B32B 17/10339; B32B 17/10651;
(Continued)

(56) References Cited

U.S. PATENT DOCUMENTS

| 5,641,558 A | 6/1997 | Noda et al. |
| 2006/0208907 A1 | 9/2006 | Kokuryo et al. |

(Continued)

FOREIGN PATENT DOCUMENTS

| CN | 102471153 A | 5/2012 |
| CN | 104781205 A | 7/2015 |

(Continued)

OTHER PUBLICATIONS

The First Office Action for the Application No. 201980031162.2 from The State Intellectual Property Office of the People's Republic of China dated Apr. 8, 2022.
(Continued)

*Primary Examiner* — Maria V Ewald
*Assistant Examiner* — Ethan Weydemeyer
(74) *Attorney, Agent, or Firm* — Cheng Law Group, PLLC

(57) ABSTRACT

Provided is an interlayer film for laminated glass that is excellent in unity of appearance. An interlayer film for laminated glass according to the present invention has a first colored part including a part located on one end side of the interlayer film, and a second colored part including a part located on the other end side of the interlayer film, the first colored part has a first gradation part where visible light transmittance increases from the one end side toward the
(Continued)

other end side of the interlayer film, the first gradation part forms a tip of the first colored part on the other end side of the interlayer film, the second colored part has a second gradation part where visible light transmittance increases from the other end side toward the one end side of the interlayer film, the second gradation part forms a tip of the second colored part on the one end side of the interlayer film, and the first gradation part and the second gradation part exist in a specific positional relationship.

16 Claims, 10 Drawing Sheets

(51) Int. Cl.
    *B60Q 1/30*     (2006.01)
    *B60Q 1/44*     (2006.01)
    *F21S 43/20*     (2018.01)
    *F21W 103/35*     (2018.01)

(52) U.S. Cl.
    CPC .... *B32B 17/10651* (2013.01); *B32B 17/1066* (2013.01); *B32B 17/10761* (2013.01); *B60J 1/001* (2013.01); *B60Q 1/44* (2013.01); *F21S 43/26* (2018.01); *B32B 2307/402* (2013.01); *B32B 2307/412* (2013.01); *B32B 2605/006* (2013.01); *B32B 2605/08* (2013.01); *F21W 2103/35* (2018.01)

(58) Field of Classification Search
    CPC ........... B32B 17/1066; B32B 17/10761; F21S 43/26; B60J 1/001; B60Q 1/44
    See application file for complete search history.

(56) References Cited

U.S. PATENT DOCUMENTS

| | | |
|---|---|---|
| 2007/0026210 A1 | 2/2007 | Onishi et al. |
| 2007/0231584 A1 | 10/2007 | Hasegawa |
| 2011/0287265 A1 | 11/2011 | Hasegawa |
| 2012/0164409 A1 | 6/2012 | Masaki |
| 2015/0168619 A1 | 6/2015 | Ohmoto et al. |
| 2016/0288460 A1 | 10/2016 | Nakayama et al. |
| 2016/0288465 A1 | 10/2016 | Nakayama et al. |
| 2018/0117887 A1 | 5/2018 | Nakayama et al. |
| 2018/0264785 A1 | 9/2018 | Oota et al. |
| 2020/0070479 A1 | 3/2020 | Nakayama et al. |

FOREIGN PATENT DOCUMENTS

| | | | |
|---|---|---|---|
| CN | 105722802 | A | 6/2016 |
| CN | 108025968 | A | 5/2018 |
| JP | S64-063419 | A | 3/1989 |
| JP | 3-115143 | A | 5/1991 |
| JP | H06-040252 | A | 2/1994 |
| JP | 9-123243 | A | 5/1997 |
| JP | H10-147177 | A | 6/1998 |
| JP | 2005-089244 | A | 4/2005 |
| JP | 2006-240552 | A | 9/2006 |
| JP | 2012-218972 | A | 11/2012 |
| WO | WO-2006/082800 | A1 | 8/2006 |
| WO | WO-2014/077328 | A1 | 5/2014 |
| WO | WO-2015/072538 | A1 | 5/2015 |

OTHER PUBLICATIONS

Japanese Office Action for the Application No. 2019-541370 mailed Apr. 4, 2023.
International Search Report for the Application No. PCT/JP2019/019442 mailed Aug. 13, 2019.
Written Opinion of the International Searching Authority (PCT/ISA/237) for Application No. PCT/JP2019/019442 mailed Aug. 13, 2019.
Written Opinion of the International Searching Authority (PCT/ISA/237) for Application No. PCT/JP2019/019442 mailed Aug. 13, 2019 (English Translation mailed Nov. 26, 2020).
Supplementary European Search Report for the Application No. EP 19 804 451.3 dated Jan. 4, 2022.

[FIG. 1]
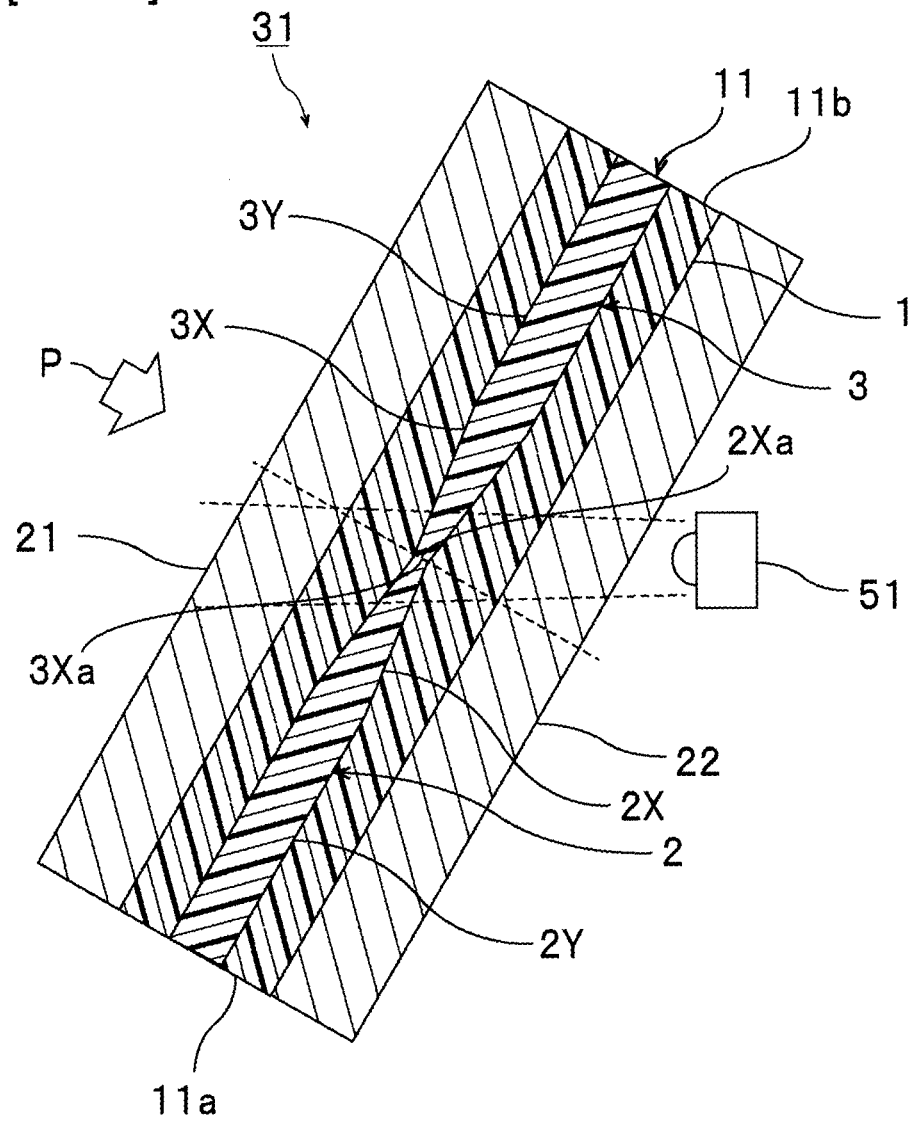

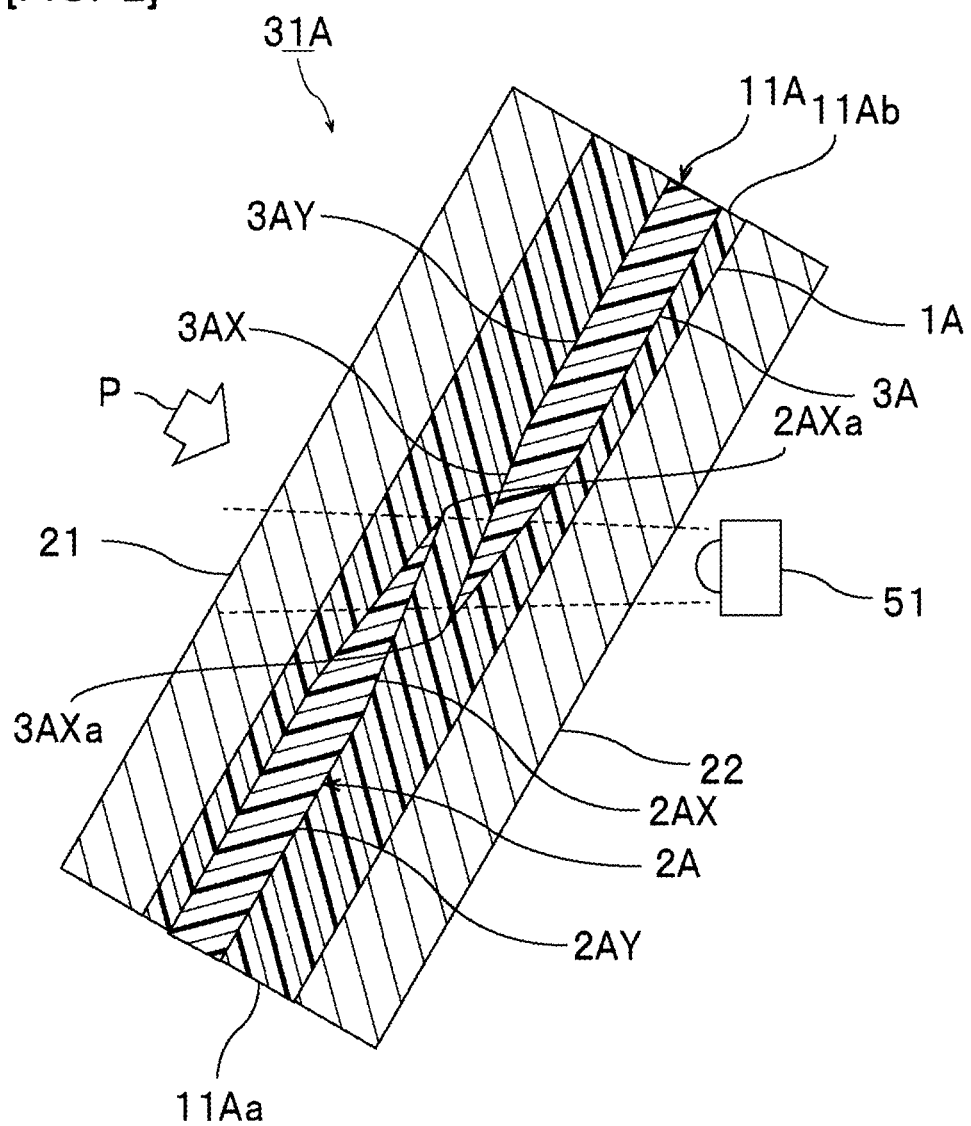
[FIG. 2]

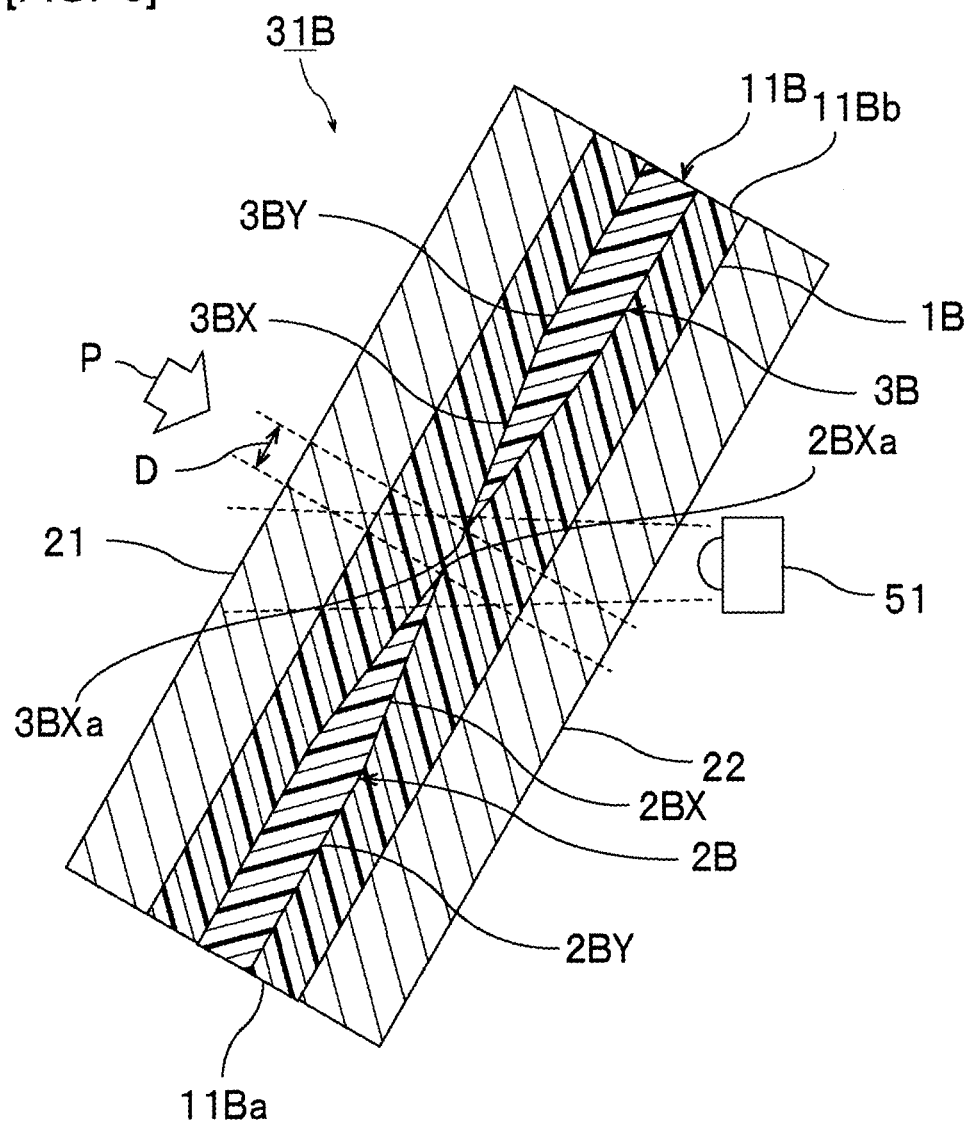
[FIG. 3]

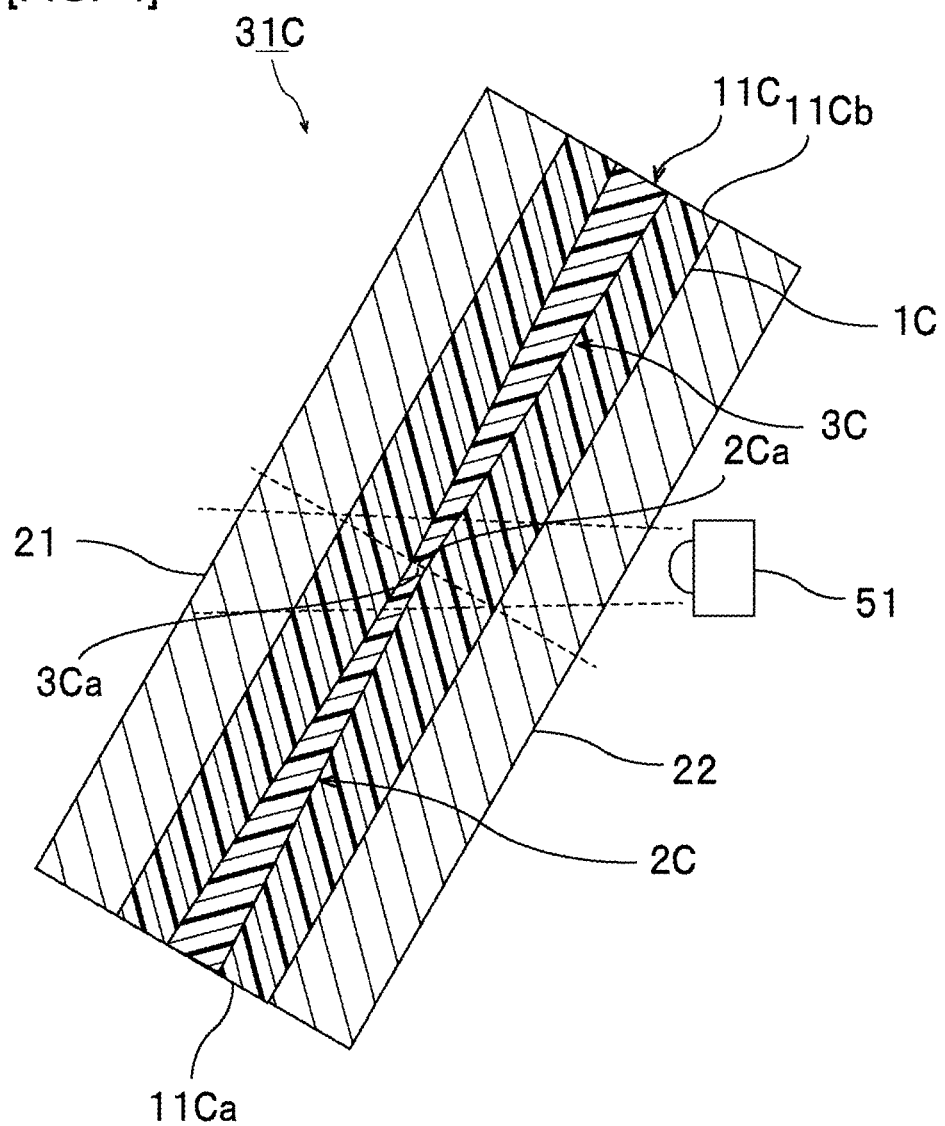
[FIG. 4]

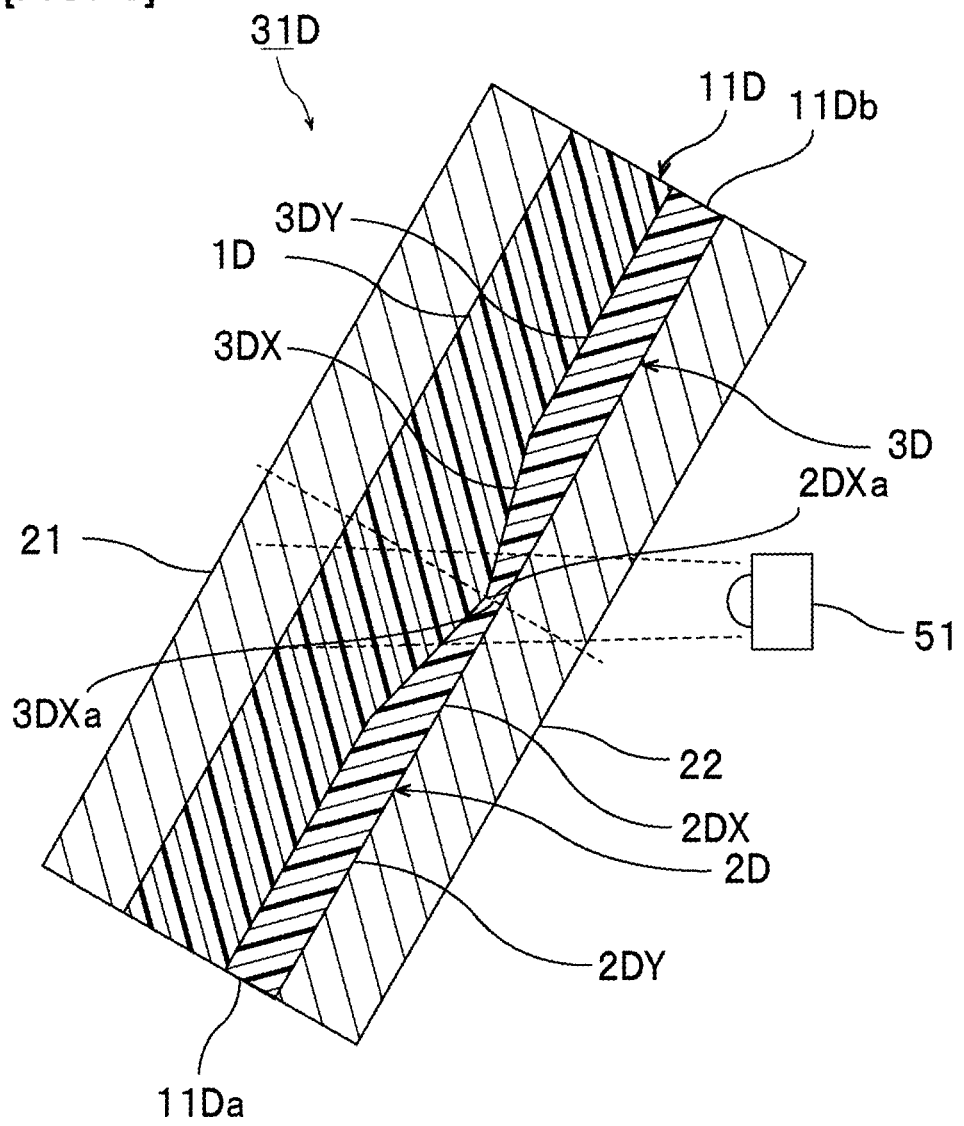
[FIG. 5]

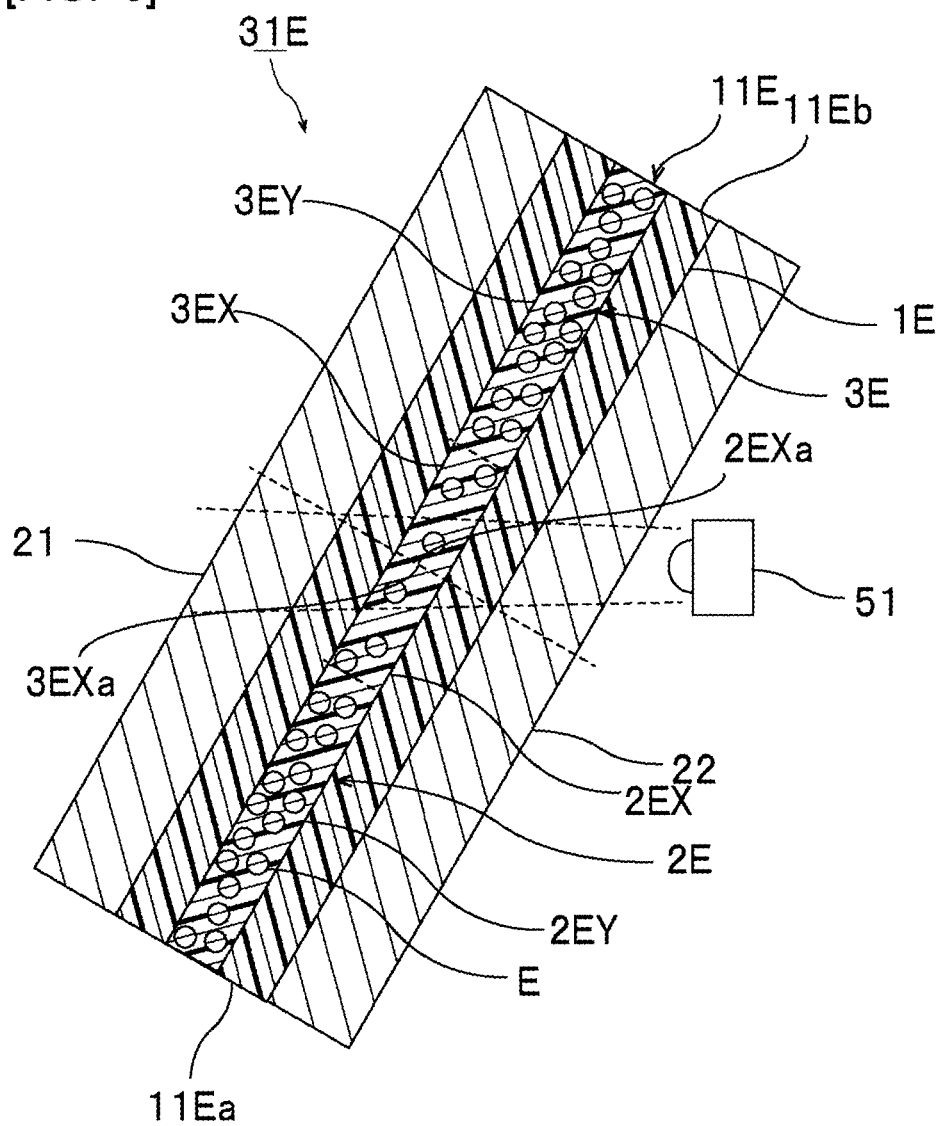
[FIG. 6]

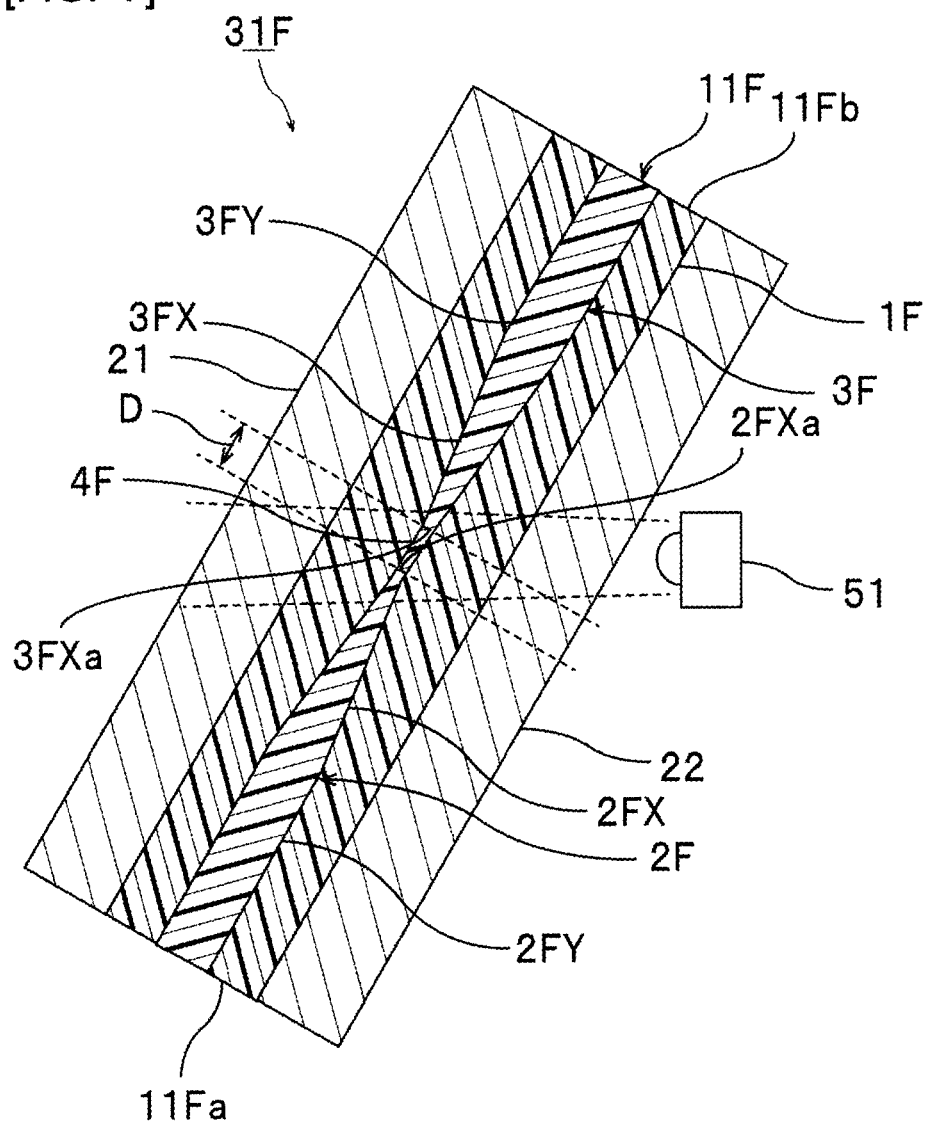
[FIG. 7]

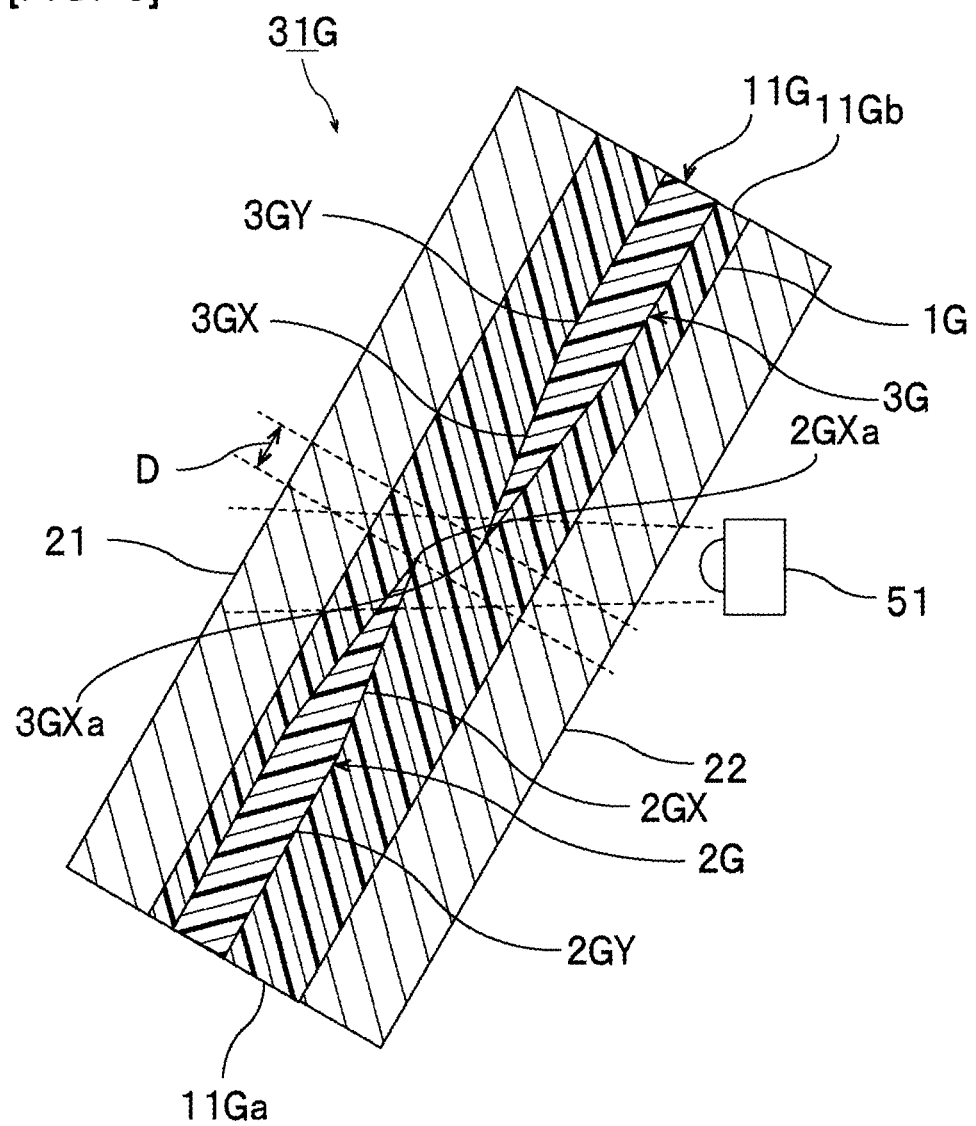
[FIG. 8]

[FIG. 9.]
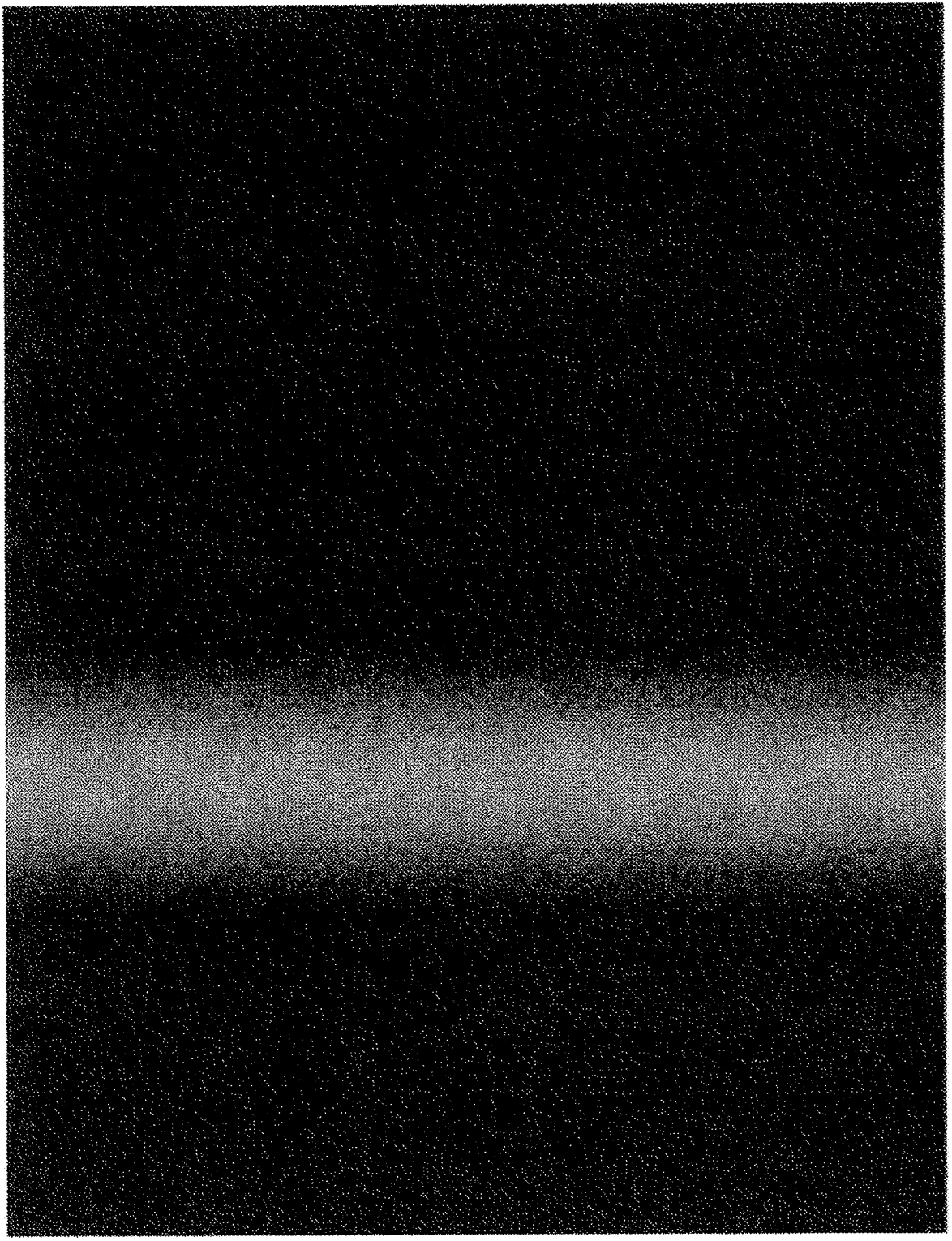

[FIG. 10.]
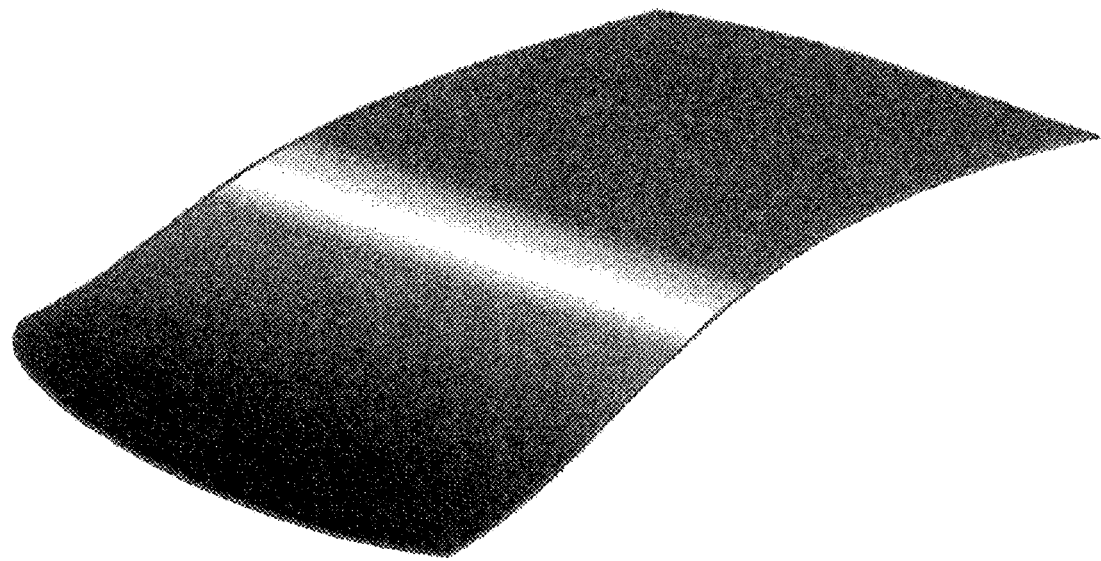
[FIG. 11.]
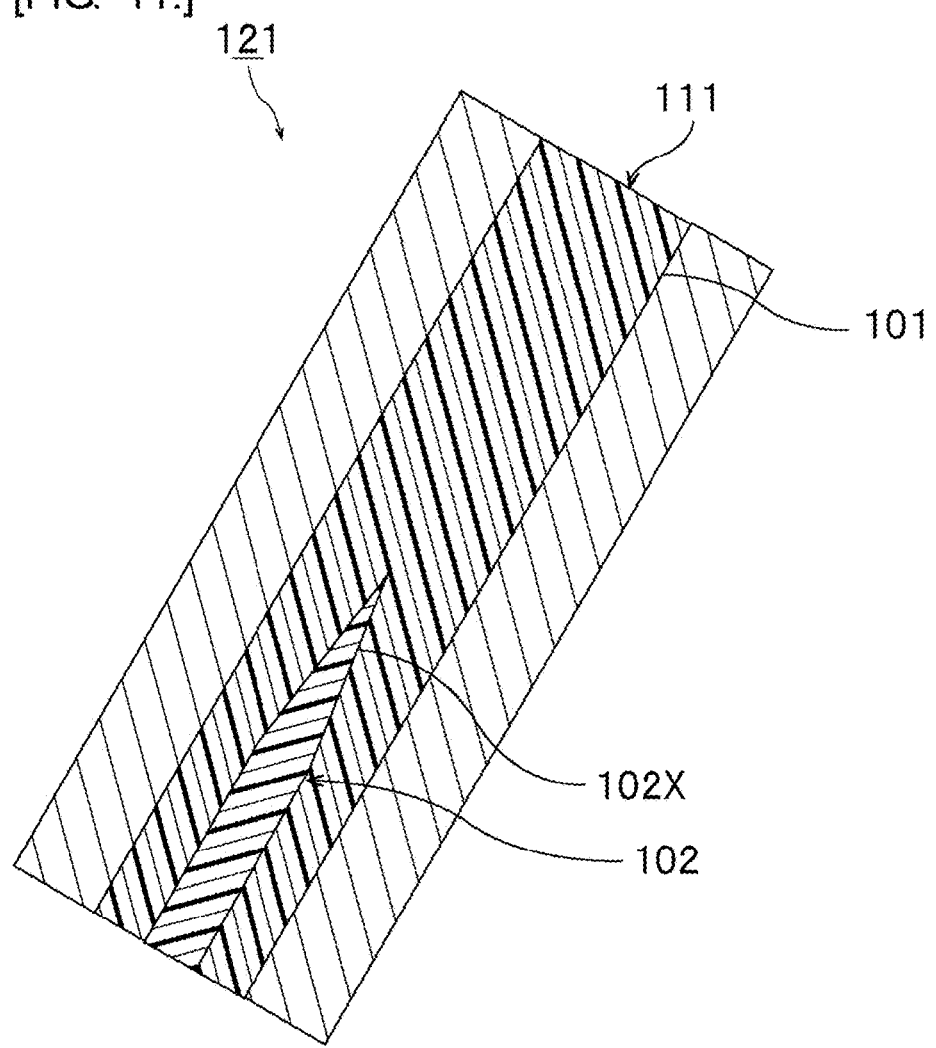

INTERMEDIATE FILM FOR LAMINATED GLASSES, LAMINATED GLASS, AND AUTOMOBILE

TECHNICAL FIELD

The present invention relates to an interlayer film for laminated glass to be used in laminated glass. Moreover, the present invention relates to a laminated glass and an automobile in which the interlayer film for laminated glass is used.

BACKGROUND ART

Laminated glass in which an interlayer film for laminated glass is sandwiched between a pair of glass plates is known. The laminated glass is widely used for automobiles, railway vehicles, aircraft, ships, buildings and the like. In recent years, laminated glass having privacy protectability is demanded as laminated glass for buildings or automobiles. In laminated glass having privacy protectability, for example, there is a region where a person or an object located behind the laminated glass is invisible although the region can transmit light.

As one example of laminated glass having privacy protectability, the following Patent Document 1 discloses a laminated glass prepared with a multilayer interlayer film having an opaque layer. In the laminated glass, privacy protectability is achieved by the opaque layer that makes a person or an object located behind the laminated glass invisible.

The following Patent Documents 2 and 3 disclose a laminated glass prepared with an interlayer film having a gradation pattern.

RELATED ART DOCUMENTS

Patent Documents

Patent Document 1: WO2006/082800A1
Patent Document 2: WO2014/077328A1
Patent Document 3: WO2015/072538A1

SUMMARY OF THE INVENTION

Problems to be Solved by the Invention

The design technology of laminated glass advances, and the application of laminated glass is diversified. As laminated glass, rear glass and roof glass are known. In such rear glass and roof glass, there is a possibility that colored laminated glass having privacy protectability is used.

As a new example of laminated glass, rear-roof integrated glass in which rear glass and roof glass are integrated, or which looks as if rear glass and roof glass were integrated is conceivable. Even for such rear-roof integrated glass, there is a possibility that colored laminated glass having privacy protectability can be used.

Also in some countries, installation of a high mounted stop lamp in an automobile is required. By installation of a high mounted stop lamp in an automobile, improvement in aerodynamic characteristics of the automobile is expected.

However, when a colored laminated glass having privacy protectability as described in Patent Document 1 is used as an interlayer film to be used in roof glass, rear glass, and rear-roof integrated glass, the light emitted from the high mounted stop lamp may not penetrate the laminated glass sufficiently.

FIG. 1 and the like of Patent Documents 2 and 3 indicate an interlayer film having a colored region on only one end side of the interlayer film. In the interlayer film, the thickness of one colored region continuously decreases toward inside the planar direction of the interlayer film. Therefore, the one colored region provides the interlayer film with a gradation pattern. When the interlayer film is used as an interlayer film for roof glass, rear glass, and rear-roof integrated glass, the light emitted from the high mounted stop lamp penetrates an uncolored region, but is difficult to penetrate the colored region sufficiently. Therefore, the colored region and the uncolored region are visually recognized clearly differentially.

FIG. 4 of Patent Documents 2 and 3 indicates an interlayer film having colored regions respectively on one end side and on the other end side of the interlayer film. In the interlayer film, the thicknesses of the two colored regions continuously decrease toward inside the planar direction of the interlayer film. Therefore, the two colored regions provide the interlayer film with a gradation pattern. In this interlayer film, however, there is a large area of an uncolored region where no colored region is provided in the center in the planar direction of the interlayer film. Therefore, even when the interlayer film is used as an interlayer film for roof glass, rear glass, and rear-roof integrated glass, the light emitted from the high mounted stop lamp penetrates an uncolored region, but is difficult to penetrate a colored region sufficiently, and the two colored regions and the uncolored region therebetween are visually recognized clearly differentially.

In recent years, design quality of roof glass, rear glass and rear-roof integrated glass is further improved, and new design quality such as unity of appearance is sometimes requested. The unity of appearance means that a colored region and an uncolored region look unified in the same color when the light emitted from the high mounted stop lamp is caused to penetrate the uncolored region and the laminated glass is observed. However, since the colored region and the uncolored region are visually recognized clearly differentially in the conventional interlayer film as described in Patent Documents 2 and 3, it is impossible to visually recognize the laminated glass integrally.

It is an object of the present invention to provide an interlayer film for laminated glass that is excellent in unity of appearance.

It is also an object of the present invention to provide a laminated glass and an automobile in which the interlayer film for laminated glass is used.

Means for Solving the Problems

According to a broad aspect of the present invention, there is provided an interlayer film for laminated glass (hereinafter, sometimes described as interlayer film) having: one end; and the other end at an opposite side of the one end, the interlayer film having: a first colored part; and a second colored part, the first colored part including a part located closer to the one end of the interlayer film than the second colored part, the second colored part including a part located closer to the other end of the interlayer film than the first colored part, the first colored part having a first gradation part where visible light transmittance increases from the one end side toward the other end side of the interlayer film, the first gradation part forming a tip of the first colored part on the other end side of the interlayer film, the second colored part having a second gradation part where visible light transmittance increases from the other end side toward the one end side of the interlayer film, the second gradation part forming a tip of the second colored part on the one end side of the interlayer film, the interlayer film having the following configuration A, configuration B or configuration C.

Configuration A: "When the interlayer film is planarly viewed, the tip of the first gradation part and the tip of the second gradation part are located at an identical position."

Configuration B: "When the interlayer film is planarly viewed, there is a region where the first gradation part and the second gradation part overlap."

Configuration C: "When the interlayer film is planarly viewed, the first gradation part and the second gradation part do not overlap, and when the interlayer film is planarly viewed, a distance of a part between the tip of the first gradation part and the tip of the second gradation part is more than 0 cm and 30 cm or less."

In a specific aspect of the interlayer film according to the present invention, when the interlayer film is planarly viewed, a plane area of a part where at least one of the first colored part and the second colored part exists is 80% or more in 100% of the total plane area of the interlayer film.

In a specific aspect of the interlayer film according to the present invention, when a laminated glass is obtained by sandwiching the interlayer film for laminated glass between two sheets of green glass in conformity with JIS R3208 and having a thickness of 2 mm, a plane area of a part having visible light transmittance of 60% or less is 80% or more in 100% of the total plane area of the laminated glass.

In a specific aspect of the interlayer film according to the present invention, when a laminated glass is obtained by sandwiching the interlayer film for laminated glass between two sheets of green glass in conformity with JIS R3208 and having a thickness of 2 mm, visible light transmittance of a part having maximum visible light transmittance in the entire laminated glass is 60% or less.

In a specific aspect of the interlayer film according to the present invention, the first colored part reaches the one end of the interlayer film, and the second colored part reaches the other end of the interlayer film.

In a specific aspect of the interlayer film according to the present invention, the interlayer film includes a transparent part arranged on at least one surface side of the first colored part in the thickness direction of the interlayer film, and a transparent part arranged on at least one surface side of the second colored part in the thickness direction of the interlayer film.

In a specific aspect of the interlayer film according to the present invention, the interlayer film is an interlayer film for laminated glass to be used in a back light or brake light display part.

In a specific aspect of the interlayer film according to the present invention, the interlayer film is used in rear glass, roof glass or rear-roof integrated glass.

In a specific aspect of the interlayer film according to the present invention, the interlayer film has the configuration A: "When the interlayer film is planarly viewed, the tip of the first gradation part and the tip of the second gradation part are located at an identical position."

In a specific aspect of the interlayer film according to the present invention, the interlayer film has the configuration B: "When the interlayer film is planarly viewed, there is a region where the first gradation part and the second gradation part overlap."

In a specific aspect of the interlayer film according to the present invention, the interlayer film has the configuration C: "When the interlayer film is planarly viewed, the first gradation part and the second gradation part do not overlap, and when the interlayer film is planarly viewed, a distance between the tip of the first gradation part and the tip of the second gradation part is more than 0 cm and 30 cm or less."

According to a broad aspect of the present invention, there is provided a laminated glass including a first lamination glass member, a second lamination glass member, and the above-described interlayer film for laminated glass, the interlayer film for laminated glass being arranged between the first lamination glass member and the second lamination glass member.

In a specific aspect of the laminated glass according to the present invention, a plane area of a part having visible light transmittance of 60% or less is 80% or more in 100% of the total plane area of the laminated glass.

In a specific aspect of the laminated glass according to the present invention, visible light transmittance of a part having maximum visible light transmittance in the entire laminated glass is 60% or less.

According to a broad aspect of the present invention, there is provided an automobile including: an automobile body; and a laminated glass as window glass of the automobile, the laminated glass including a first lamination glass member, a second lamination glass member, and the above-described interlayer film for laminated glass, the interlayer film for laminated glass being arranged between the first lamination glass member and the second lamination glass member.

In a specific aspect of the automobile according to the present invention, the automobile includes a back light or a brake light, and when the interlayer film has the configuration A, a part where the tip of the first gradation part and the tip of the second gradation part are located at an identical position is a display part of the back light or the brake light; when the interlayer film has the configuration B, the region where the first gradation part and the second gradation part overlap is a display part of the back light or the brake light; and when the interlayer film has the configuration C, the part between the tip of the first gradation part and the tip of the second gradation part is a display part of the back light or the brake light.

Effect of the Invention

The interlayer film for laminated glass according to the present invention has one end and the other end being at the opposite side of the one end. The interlayer film for laminated glass according to the present invention has a first colored part, and a second colored part, the first colored part includes a part located closer to the one end of the interlayer film than the second colored part, and the second colored part includes a part located closer to the other end of the interlayer film than the first colored part. In the interlayer film for laminated glass according to the present invention, the first colored part has a first gradation part where visible light transmittance increases from the one end side toward the other end side of the interlayer film, and the first gradation part forms a tip of the first colored part on the other end side of the interlayer film. In the interlayer film for laminated glass according to the present invention, the second colored part has a second gradation part where visible light transmittance increases from the other end side toward the one end side of the interlayer film, and the second gradation part forms a tip of the second colored part on the one end side of the interlayer film. The interlayer film for laminated glass according to the present invention has the configuration A, the configuration B or the configuration C. The interlayer film for laminated glass according to the present invention is excellent in unity of appearance because the aforementioned general configuration is provided.

BRIEF DESCRIPTION OF DRAWINGS

FIG. 1 is a sectional view schematically showing an interlayer film for laminated glass and a laminated glass in accordance with a first embodiment of the present invention.

FIG. 2 is a sectional view schematically showing an interlayer film for laminated glass and a laminated glass in accordance with a second embodiment of the present invention.

FIG. 3 is a sectional view schematically showing an interlayer film for laminated glass and a laminated glass in accordance with a third embodiment of the present invention.

FIG. 4 is a sectional view schematically showing an interlayer film for laminated glass and a laminated glass in accordance with a fourth embodiment of the present invention.

FIG. 5 is a sectional view schematically showing an interlayer film for laminated glass and a laminated glass in accordance with a fifth embodiment of the present invention.

FIG. 6 is a sectional view schematically showing an interlayer film for laminated glass and a laminated glass in accordance with a sixth embodiment of the present invention.

FIG. 7 is a sectional view schematically showing an interlayer film for laminated glass and a laminated glass in accordance with a seventh embodiment of the present invention.

FIG. 8 is a sectional view schematically showing an interlayer film for laminated glass and a laminated glass in accordance with an eighth embodiment of the present invention.

FIG. 9 is a plan view schematically showing an interlayer film for laminated glass and a laminated glass in accordance with a ninth embodiment of the present invention.

FIG. 10 is a perspective view schematically showing an interlayer film for laminated glass and a laminated glass in accordance with a tenth embodiment of the present invention.

FIG. 11 is a perspective view schematically showing a conventional laminated glass.

MODES FOR CARRYING OUT THE INVENTION

Hereinafter, the present invention will be described in detail.

The interlayer film for laminated glass according to the present invention (hereinafter, sometimes described as interlayer film) has a one end, and the other end being at the opposite side of the one end. The one end and the other end of the interlayer film according to the present invention are end parts of both sides facing each other.

The interlayer film according to the present invention has a first colored part and a second colored part. The first colored part includes a part located closer to the one end of the interlayer film than the second colored part. The second colored part includes a part located closer to the other end of the interlayer film than the first colored part. The tip of the first colored part on the one end side of the interlayer film is located closer to the one end of the interlayer film than the tip of the second colored part on the one end side of the interlayer film. The tip of the second colored part on the other end side of the interlayer film is located closer to the other end of the interlayer film than the tip of the first colored part on the other end side of the interlayer film.

The first colored part has a first gradation part. The first gradation part is a part where visible light transmittance increases from the one end side toward the other end side of the interlayer film. By the variation in visible light transmittance, the color tone of the first gradation part varies. For example, in the first gradation part, the color tone becomes lighter from the one end side toward the other end side of the interlayer film. The first gradation part forms a tip of the first colored part on the other end side of the interlayer film. The tip of the part where visible light transmittance increases from the one end side toward the other end side of the interlayer film is the tip of the first gradation part.

The second colored part has a second gradation part. The second gradation part is a part where visible light transmittance increases from the other end side toward the one end side of the interlayer film. By the variation in visible light transmittance, the color tone of the second gradation part varies. For example, in the second gradation part, the color tone becomes lighter from the other end side toward the one end side of the interlayer film. The second gradation part forms a tip of the second colored part on the one end side of the interlayer film. The tip of the part where visible light transmittance increases from the other end side toward the one end side of the interlayer film is the tip of the second gradation part.

The interlayer film according to the present invention further has the following configuration A, configuration B or configuration C, in addition to the aforementioned configuration.

Configuration A: "When the interlayer film is planarly viewed, the tip of the first gradation part and the tip of the second gradation part are located at an identical position."

Configuration B: "When the interlayer film is planarly viewed, there is a region where the first gradation part and the second gradation part overlap."

Configuration C: "When the interlayer film is planarly viewed, the first gradation part and the second gradation part do not overlap, and when the interlayer film is planarly viewed, a distance of a part between the tip of the first gradation part and the tip of the second gradation part is more than 0 cm and 30 cm or less."

The interlayer film according to the present invention is excellent in unity of appearance because the aforementioned overall configuration is provided. The laminated glass prepared with the interlayer film according to the present invention is excellent in unity of appearance in the first and second gradation parts or the vicinity thereof of the interlayer film.

In the present description, "unity of appearance" means the design quality that the first and second gradation parts or the vicinity thereof look unified in the same color when the interlayer film for laminated glass is observed.

The interlayer film according to the present invention is used for obtaining a laminated glass. The interlayer film according to the present invention is an interlayer film for laminated glass suited for a laminated glass. The interlayer film according to the present invention is an interlayer film for laminated glass that can be used in a laminated glass. The laminated glass can be used for automobiles, railway vehicles, aircraft, ships, buildings, and the like. The interlayer film and the laminated glass according to the present invention are preferably used in a back light or brake light display part. The interlayer film and the laminated glass according to the present invention is preferably used in rear glass, roof glass or rear-roof integrated glass, and is more preferably used in rear-roof integrated glass. The interlayer film and the laminated glass according to the present invention is preferably used in rear glass having a display part of back light or brake light, roof glass having a display part of back light or brake light, or rear-roof integrated glass having a display part of back light or brake light.

In the laminated glass prepared with the interlayer film according to the present invention, by applying the light from the back light or the brake light to the first and second gradation parts or the vicinity thereof of the interlayer film, the light of the back light or the brake light can be visually recognized satisfactorily.

FIG. 11 is a perspective view schematically showing a conventional interlayer film for laminated glass and laminated glass. An interlayer film 111 shown in FIG. 11 is in a laminated glass 121 prepared therewith. In the interlayer film 111, only a first colored part 102 having a first gradation part 102X is formed in a transparent part 101, and a second colored part is not formed. In the laminated glass 121, the one side and the other side of the first gradation part 102X are visually recognized clearly differentially, so that the unity of appearance is poor.

The first colored part usually contains a coloring agent. The first gradation part can be prepared by the following (1) and (2) and the like methods. (1) Method of decreasing the thickness of the first colored part from the one end side toward the other end side of the interlayer film. (2) Method of decreasing the concentration of the coloring agent from the one end side toward the other end side of the interlayer film.

The first gradation part is, for example, a part where the thickness of the first colored part decreases from the one end side toward the other end side of the interlayer film, or a part where the concentration of the coloring agent in the first colored part decreases from the one end side toward the other end side of the interlayer film. From the viewpoint of further improving the gradation condition, it is preferred that the first gradation part be a part where the thickness of the first colored part decreases from the one end side toward the other end side of the interlayer film.

The second colored part usually contains a coloring agent. The second gradation part can be prepared by the following (1) and (2) and the like methods. (1) Method of decreasing the thickness of the second colored part from the other end side toward the one end side of the interlayer film. (2) Method of decreasing the concentration of the coloring agent from the other end side toward the one end side of the interlayer film.

The second gradation part is, for example, a part where the thickness of the second colored part decreases from the other end side toward the one end side of the interlayer film, or a part where the concentration of the coloring agent in the second colored part decreases from the other end side toward the one end side of the interlayer film. From the viewpoint of further improving the gradation condition, it is preferred that the second gradation part be a part where the thickness of the second colored part decreases from the other end side toward the one end side of the interlayer film.

The interlayer film according to the present invention may have a transparent part.

Whether or not a certain part is a transparent part can be determined, for example, in the following manner. A laminated glass is obtained by sandwiching a transparent part having a thickness of 800 μm between two sheets of green glass in conformity with JIS R3208 and having a thickness of 2 mm. When visible light transmittance of the laminated glass is more than 60%, the part is determined as a transparent part. The transparent part may contain a coloring agent, or need not contain a coloring agent. For example, when the thickness of the transparent part of the interlayer film is less than 800 μm, a transparent part for measuring visible light transmittance may be separately prepared. When the thickness of the transparent part of the interlayer film is more than 800 μm, the transparent part may be cut to obtain a transparent part for measuring visible light transmittance.

From the viewpoint of suppressing deterioration in color tone, it is preferred that the interlayer film have a transparent part, and it is preferred that a transparent part be arranged on at least one surface side of the first colored part in the thickness direction of the interlayer film. From the viewpoint of suppressing deterioration in color tone, it is preferred that a transparent part be arranged on both surface sides of the first colored part in the thickness direction of the interlayer film. From the viewpoint of suppressing deterioration in color tone, it is preferred that the first colored part be embedded in the transparent part. From the viewpoint of suppressing deterioration in color tone, it is preferred that the first colored part be arranged between transparent parts.

From the viewpoint of suppressing deterioration in color tone, it is preferred that the interlayer film have a transparent part, and it is preferred that a transparent part be arranged on at least one surface side of the second colored part in the thickness direction of the interlayer film. From the viewpoint of suppressing deterioration in color tone, it is preferred that a transparent part be arranged on both surface sides of the second colored part in the thickness direction of the interlayer film. From the viewpoint of suppressing deterioration in color tone, it is preferred that the second colored part be embedded in the transparent part. From the viewpoint of suppressing deterioration in color tone, it is preferred that the second colored part be arranged between transparent parts.

The transparent part arranged on at least one surface side of the first colored part, and the transparent part arranged on at least one surface side of the second colored part may be the same or different from each other. The transparent part arranged on at least one surface side of the first colored part, and the transparent part arranged on at least one surface side of the second colored part may be continuous or need not be continuous.

The interlayer film has the configuration A, the configuration B or the configuration C. The interlayer film may have the configuration A or the configuration B, may have the configuration A or the configuration C, and may have the configuration B or the configuration C. The interlayer film may have the configuration A, may have the configuration B, and may have the configuration C.

In the configuration A, when the interlayer film is planarly viewed, the tip of the first gradation part and the tip of the second gradation part are located at an identical position. The tip of the first gradation part and the tip of the second gradation part need not be in contact with each other. It is preferred that the tip of the first gradation part and the tip of the second gradation part be in contact with each other. In the part where the tip of the first gradation part and the tip of the second gradation part are located at an identical position, there may be a boundary line, there need not be a boundary line, there may be a boundary plane, and there need not be a boundary plane. The first colored part and the second colored part may be integrally formed. The tip of the first gradation part and the tip of the second gradation part may be formed integrally. The tip of the first gradation part and the tip of the second gradation part may be in surface contact with each other, and may be in point contact with each other.

In the configuration A, the first and second gradation parts can be visually recognized integrally. Therefore, the interlayer film and the laminated glass are excellent in unity of appearance. When the interlayer film is planarly viewed, it is possible to visually recognize such a gradation pattern that the color tone deepens toward both sides centered at the part where the tip of the first gradation part and the tip of the second gradation part are located at an identical position.

In the configuration B, when the interlayer film is planarly viewed, there is a region where the first gradation part and the second gradation part overlap. The first gradation part includes a part located closer to the other end of the interlayer film than the tip of the second gradation part. The second gradation part includes a part located closer to the one end of the interlayer film than the tip of the first gradation part. The tip of the first gradation part on the other end side of the interlayer film is located closer to the other end of the interlayer film than the tip of the second gradation part on the one end side of the interlayer film. The tip of the second gradation part on the one end side of the interlayer film is located closer to the one end of the interlayer film than the tip of the first gradation part on the other end side of the interlayer film.

In the configuration B, in the region where the first gradation part and the second gradation part overlap, the first gradation part and the second gradation part may be in surface contact with each other, or need not be in surface contact with each other in the thickness direction of the interlayer film. A transparent part may be arranged between the first gradation part and the second gradation part.

The distance over which the first gradation part and the second gradation part overlap is preferably 30 cm or less, more preferably 20 cm or less, further preferably 15 cm or less, especially preferably 10 cm or less, most preferably 5 cm or less.

It is preferred that the overlap distance be a distance in the direction connecting the one end and the other end of the interlayer film.

In the configuration B, it is preferred that the first colored part and the second colored part exist at different depth positions in the thickness direction of the interlayer film. In this case, it is possible to express the design exhibiting various colors depending on the orientation and the angle in which the laminated glass is observed.

From the viewpoint of further enhancing the unity of appearance, it is preferred that there further be a region where the first gradation part and the second gradation part do not overlap in the configuration B when the interlayer film is planarly viewed. It is preferred that the first gradation part include a part located closer to the one end of the interlayer film than the second gradation part. It is preferred that the second gradation part include a part located closer to the other end of the interlayer film than the first gradation part. It is preferred that the tip of the first gradation part on the one end side of the interlayer film be located closer to the one end of the interlayer film than the tip of the second gradation part on the one end side of the interlayer film. It is preferred that the tip of the second gradation part on the other end side of the interlayer film be located closer to the other end of the interlayer film than the tip of the first gradation part on the other end side of the interlayer film.

In the configuration B, the first and second gradation parts can be visually recognized integrally. Therefore, the interlayer film and the laminated glass are excellent in unity of appearance.

In the configuration C, when the interlayer film is planarly viewed, the first gradation part and the second gradation part do not overlap, and when the interlayer film is planarly viewed, a distance (hereinafter, sometimes described as distance D) of a part between the tip of the first gradation part and the tip of the second gradation part is more than 0 cm and 30 cm or less. The first gradation part does not include a part located closer to the other end of the interlayer film than the second gradation part. The second gradation part does not include a part located closer to the one end of the interlayer film than the first gradation part. The tip of the first gradation part on the other end side of the interlayer film is located closer to the one end of the interlayer film than the tip of the second gradation part on the one end side of the interlayer film. The tip of the second gradation part on the one end side of the interlayer film is located closer to the other end of the interlayer film than the tip of the first gradation part on the other end side of the interlayer film.

In the configuration C, the first colored part and the second colored part may exist at the same depth position in the thickness direction of the interlayer film, or may exist at different depth positions in the thickness direction of the interlayer film. From the viewpoint of expressing the design exhibiting various colors depending on the orientation and the angle in which the laminated glass is observed, it is preferred that the first colored part and the second colored part exist at different depth positions in the thickness direction of the interlayer film in the configuration C. From the viewpoint of expressing the design of an uniform color regardless of the orientation and the angle in which the laminated glass is observed, it is preferred that the first colored part and the second colored part exist at the same depth position in the thickness direction of the interlayer film in the configuration C.

In the configuration C, the distance D is relatively small. Therefore, in the interlayer film and the laminated glass, it is possible to visually recognize the first and second gradation parts as almost integrally. Therefore, the interlayer film and the laminated glass are excellent in unity of appearance. The smaller the distance D, the first and second gradation parts can be visually recognized as being further integrally.

From the viewpoint of further enhancing the unity of appearance, and from the viewpoint of visually recognizing the light of the back light or the brake light with a better gradation condition, the distance D is preferably 20 cm or less, more preferably 15 cm or less, further preferably 10 cm or less, especially preferably 5 cm or less.

The distance D is determined as a distance in the planar direction of the interlayer film (see later-described FIGS. 3, 7, 8).

From the viewpoint of further enhancing the unity of appearance, when the interlayer film is planarly viewed, a plane area of a part where at least one of the first colored part and the second colored part exists is preferably 80% or more, more preferably 90% or more, still more preferably 92% or more, further preferably 94% or more, still further preferably 95% or more, in 100% of the total plane area of the interlayer film. In 100% of the total plane area of the interlayer film, a plane area of the part where at least one of the first colored part and the second colored part exists is 100% or less. In 100% of the total plane area of the interlayer film, a plane area of the part where at least one of the first colored part and the second colored part exists may be 100%.

When a laminated glass is obtained by sandwiching an interlayer film for laminated glass between two sheets of green glass in conformity with JIS R3208 and having a thickness of 2 mm, the obtained laminated glass is referred to as a laminated glass L1. In the laminated glass L1, a green glass having a thickness of 2 mm is used. In this case, the green glass is a green glass for measuring visible light transmittance. Also, the laminated glass actually obtained by using the interlayer film for laminated glass according to the present invention is referred to as a laminated glass L2. In the laminated glass L2, a green glass having a thickness of 2 mm may be used, and a green glass having a thickness of 2 mm need not be used.

From the viewpoint of further enhancing the unity of appearance, a plane area of a part having visible light transmittance of 60% or less is preferably 80% or more, more preferably 90% or more, still more preferably 92% or more, further preferably 94% or more, still further preferably 95% or more, in 100% of the total plane area of the laminated glass L1 and the laminated glass L2. In 100% of the total plane area of the laminated glass L1 and the laminated glass L2, a plane area of the part having visible light transmittance of 60% or less is 100% or less. In 100% of the total plane area of the laminated glass L1 and the laminated glass L2, a plane area of the part having visible light transmittance of 60% or less may be 100%.

From the viewpoint of further enhancing the unity of appearance, a plane area of the part having visible light transmittance of 50% or less is preferably 80% or more, more preferably 90% or more, still more preferably 92% or more, further preferably 94% or more, still further preferably 95% or more, in 100% of the total plane area of the laminated glass L1 and the laminated glass L2. In 100% of the total plane area of the laminated glass L1 and the laminated glass L2, a plane area of the part having visible light transmittance of 50% or less is 100% or less. In 100% of the total plane area of the laminated glass L1 and the laminated glass L2, a plane area of the part having visible light transmittance of 50% or less may be 100%.

From the viewpoint of further enhancing the unity of appearance, a plane area of the part having visible light transmittance of 40% or less is preferably 80% or more, more preferably 90% or more, still more preferably 92% or more, further preferably 94% or more, still further preferably 95% or more, in 100% of the total plane area of the laminated glass L1 and the laminated glass L2. In 100% of the total plane area of the laminated glass L1 and the laminated glass L2, a plane area of the part having visible light transmittance of 40% or less is 100% or less. In 100% of the total plane area of the laminated glass L1 and the laminated glass L2, a plane area of the part having visible light transmittance of 40% or less may be 100%.

From the viewpoint of further enhancing the unity of appearance, visible light transmittance of a part having maximum visible light transmittance is preferably 60% or less, more preferably 50% or less, further preferably 40% or less in the entire laminated glass L1 and laminated glass L2.

Visible light transmittance of the laminated glass L1, the laminated glass L2 and the laminated glass according to the present invention is determined by measuring transmittance at a wavelength of 380 nm to 780 nm of the laminated glass in conformity with JIS R3106:1998 or JIS R3212:1998 using a spectrophotometer ("U-4100" available from Hitachi High-tech Corporation).

A laminated glass according to the present invention includes a first lamination glass member, a second lamination glass member and the interlayer film. The interlayer film for laminated glass is arranged between the first lamination glass member and the second lamination glass member.

An automobile according to the present invention includes an automobile body, and a laminated glass as window glass of the automobile. The laminated glass includes the first lamination glass member, the second lamination glass member, and the interlayer film. The interlayer film is arranged between the first lamination glass member and the second lamination glass member.

Hereinafter, specific embodiments of the present invention will be described with reference to the drawings. The size and dimension of the interlayer film and the laminated glass in FIGS. 1 to 8 are appropriately changed from the actual size and shape for convenience of illustration. In FIGS. 1 to 8, different points are interchangeable. In FIGS. 1 to 8, the part that may have the same configuration is sometimes denoted by the same reference symbol.

FIG. 1 is a sectional view schematically showing an interlayer film for laminated glass and a laminated glass in accordance with a first embodiment of the present invention.

An interlayer film 11 shown in FIG. 1 has the configuration A.

The interlayer film 11 has one end 11a and the other end 11b at the opposite side of the one end 11a.

The interlayer film 11 has a transparent part 1, a first colored part 2, and a second colored part 3. The first colored part 2 includes a part located closer to the one end 11a of the interlayer film 11 than the second colored part 3. The second colored part 3 includes a part located closer to the other end 11b of the interlayer film 11 than the first colored part 2. The first colored part 2 reaches the one end 11a of the interlayer film 11. The second colored part 3 reaches the other end 11b of the interlayer film 11. In the thickness direction of the interlayer film 11, the first colored part 2 and the second colored part 3 exist at the same depth position.

On both surface sides of the first colored part 2, the transparent part 1 is arranged. The first colored part 2 is embedded in the transparent part 1. On both surface sides of the second colored part 3, the transparent part 1 is arranged. The second colored part 3 is embedded in the transparent part 1. The transparent part 1 is a surface layer of the interlayer film 11. Each of the first colored part 2 and the second colored part 3 is an intermediate layer of the interlayer film 11.

The first colored part 2 has a first gradation part 2X where visible light transmittance increases from the one end 11a side toward the other end 11b side of the interlayer film 11. The first gradation part 2X forms a tip of the first colored part 2 on the other end 11b side of the interlayer film 11. The first colored part 2 has a first non-gradation part 2Y on the one end 11a side of the interlayer film 11. The first colored part 2 reaches the one end 11a of the interlayer film 11 in the first non-gradation part 2Y. The first gradation part 2X is a part where the thickness of the first colored part 2 decreases from the one end 11a side toward the other end 11b side of the interlayer film 11. The first non-gradation part 2Y is a part where the thickness of the first colored part 2 is uniform.

The second colored part 3 has a second gradation part 3X where visible light transmittance increases from the other end 11b side toward the one end 11a side of the interlayer film 11. The second gradation part 3X forms a tip of the second colored part 3 on the one end 11a side of the interlayer film 11. The second colored part 3 has a second non-gradation part 3Y on the other end 11b side of the interlayer film 11. The second colored part 3 reaches the other end 11b of the interlayer film 11 in the second non-gradation part 3Y. The second gradation part 3X is a part where the thickness of the second colored part 3 decreases from the other end 11b side toward the one end 11a side of the interlayer film 11. The second non-gradation part 3Y is a part where the thickness of the second colored part 3 is uniform.

When the interlayer film 11 is planarly viewed (the direction of the arrow P in FIG. 1), a tip 2Xa of the first gradation part 2X and a tip 3Xa of the second gradation part 3X are located at an identical position. The tip 2Xa of the first gradation part 2X and the tip 3Xa of the second gradation part 3X are in contact with each other.

In FIG. 1, the interlayer film 11 is shown in a laminated glass 31 prepared therewith. The laminated glass 31 includes a first lamination glass member 21, a second lamination glass member 22 and the interlayer film 11. The interlayer film 11 is arranged between the first lamination glass member 21 and the second lamination glass member 22. The first lamination glass member 21 is arranged on a first surface side of the interlayer film 11 to be layered thereon. The second lamination glass member 22 is arranged on a second surface side opposite to the first surface of the interlayer film 11 to be layered thereon.

The interlayer film 11 and the laminated glass 31 have a display part of a back light or brake light 51. The part where the tip 2Xa of the first gradation part 2X and the tip 3Xa of the second gradation part 3X are located at an identical position is a display part of the back light or brake light 51. The light emitted from the back light or brake light 51 can be visually recognized in a gradation condition in the part where the tip 2Xa of the first gradation part 2X and the tip 3Xa of the second gradation part 3X are located at an identical position, and in the vicinity thereof.

FIG. 2 is a sectional view schematically showing an interlayer film for laminated glass and a laminated glass in accordance with a second embodiment of the present invention.

An interlayer film 11A shown in FIG. 2 has the configuration B.

The interlayer film 11A has one end 11Aa and the other end 11Ab at the opposite side of the one end 11Aa.

The interlayer film 11A has a transparent part 1A, a first colored part 2A, and a second colored part 3A. The first colored part 2A includes a part located closer to the one end 11Aa of the interlayer film 11A than the second colored part 3A. The second colored part 3A includes a part located closer to the other end 11Ab of the interlayer film 11A than the first colored part 2A. The first colored part 2A reaches the one end 11Aa of the interlayer film 11A. The second colored part 3A reaches the other end 11Ab of the interlayer film 11A. In the thickness direction of the interlayer film 11A, the first colored part 2A and the second colored part 3A exist at different depth positions.

On both surface sides of the first colored part 2A, the transparent part 1A is arranged. The first colored part 2A is embedded in the transparent part 1A. On both surface sides of the second colored part 3A, the transparent part 1A is arranged. The second colored part 3A is embedded in the transparent part 1A. The transparent part 1A is a surface layer of the interlayer film 11A. Each of the first colored part 2A and the second colored part 3A is an intermediate layer of the interlayer film 11A.

The first colored part 2A has a first gradation part 2AX where visible light transmittance increases from the one end 11Aa side toward the other end 11Ab side of the interlayer film 11A. The first gradation part 2AX forms a tip of the first colored part 2A on the other end 11Ab side of the interlayer film 11A. The first colored part 2A has a first non-gradation part 2AY on the one end 11Aa side of the interlayer film 11A. The first colored part 2A reaches the one end 11Aa of the interlayer film 11A in the first non-gradation part 2AY. The first gradation part 2AX is a part where the thickness of the first colored part 2A decreases from the one end 11Aa side toward the other end 11Ab side of the interlayer film 11A. The first non-gradation part 2AY is a part where the thickness of the first colored part 2A is uniform.

The second colored part 3A has a second gradation part 3AX where visible light transmittance increases from the other end 11Ab side toward the one end 11Aa side of the interlayer film 11A. The second gradation part 3AX forms a tip of the second colored part 3A on the one end 11Aa side of the interlayer film 11A. The second colored part 3A has a second non-gradation part 3AY on the other end 11Ab side of the interlayer film 11A. The second colored part 3A reaches the other end 11Ab of the interlayer film 11A in the second non-gradation part 3AY. The second gradation part 3AX is a part where the thickness of the second colored part 3A decreases from the other end 11Ab side toward the one end 11Aa side of the interlayer film 11A. The second non-gradation part 3AY is a part where the thickness of the second colored part 3A is uniform.

There is a region where the first gradation part 2AX and the second gradation part 3AX overlap when the interlayer film 11A is planarly viewed (the direction of the arrow P of FIG. 2).

In FIG. 2, the interlayer film 11A is shown in a laminated glass 31A prepared therewith. The laminated glass 31A includes a first lamination glass member 21, a second lamination glass member 22 and the interlayer film 11A. The interlayer film 11A is arranged between the first lamination glass member 21 and the second lamination glass member 22. The first lamination glass member 21 is arranged on a first surface side of the interlayer film 11A to be layered thereon. The second lamination glass member 22 is arranged on a second surface side opposite to the first surface of the interlayer film 11A to be layered thereon.

The interlayer film 11A and the laminated glass 31A have a display part of the back light or brake light 51. The part where the first gradation part 2AX and the second gradation part 3AX overlap is a display part of the back light or brake light 51. The light emitted from the back light or brake light 51 can be visually recognized in a gradation condition in the part where the first gradation part 2AX and the second gradation part 3AX overlap, and in the vicinity thereof.

FIG. 3 is a sectional view schematically showing an interlayer film for laminated glass and a laminated glass in accordance with a third embodiment of the present invention.

An interlayer film 11B shown in FIG. 3 has the configuration C.

The interlayer film 11B has one end 11Ba and the other end 11Bb at the opposite side of the one end 11Ba.

The interlayer film 11B has a transparent part 1B, a first colored part 2B, and a second colored part 3B. The first colored part 2B includes a part located closer to the one end 11Ba of the interlayer film 11B than the second colored part 3B. The second colored part 3B includes a part located closer to the other end 11Bb of the interlayer film 11B than the first colored part 2B. The first colored part 2B reaches the one end 11Ba of the interlayer film 11B. The second colored part 3B reaches the other end 11Bb of the interlayer film 11B. In the thickness direction of the interlayer film 11B, the first colored part 2B and the second colored part 3B exist at the same depth position.

On both surface sides of the first colored part 2B, the transparent part 1B is arranged. The first colored part 2B is embedded in the transparent part 1B. On both surface sides of the second colored part 3B, the transparent part 1B is arranged. The second colored part 3B is embedded in the transparent part 1B. The transparent part 1B is a surface layer of the interlayer film 11B. Each of the first colored part 2B and the second colored part 3B is an intermediate layer of the interlayer film 11B.

The first colored part 2B has a first gradation part 2BX where visible light transmittance increases from the one end 11Ba side toward the other end 11Bb side of the interlayer film 11B. The first gradation part 2BX forms a tip of the first colored part 2B on the other end 11Bb side of the interlayer film 11B. The first colored part 2B has a first non-gradation part 2BY on the one end 11Ba side of the interlayer film 11B. The first colored part 2B reaches the one end 11Ba of the interlayer film 11B in the first non-gradation part 2BY. The first gradation part 2BX is a part where the thickness of the first colored part 2B decreases from the one end 11Ba side toward the other end 11Bb side of the interlayer film 11B. The first non-gradation part 2BY is a part where the thickness of the first colored part 2B is uniform.

The second colored part 3B has a second gradation part 3BX where visible light transmittance increases from the other end 11Bb side toward the one end 11Ba side of the interlayer film 11B. The second gradation part 3BX forms a tip of the second colored part 3B on the one end 11Ba side of the interlayer film 11B. The second colored part 3B has a second non-gradation part 3BY on the other end 11Bb side of the interlayer film 11B. The second colored part 3B reaches the other end 11Bb of the interlayer film 11B in the second non-gradation part 3BY. The second gradation part 3BX is a part where the thickness of the second colored part 3B decreases from the other end 11Bb side toward the one end 11Ba side of the interlayer film 11B. The second non-gradation part 3BY is a part where the thickness of the second colored part 3B is uniform.

When the interlayer film 11B is planarly viewed (the direction of the arrow P in FIG. 3), a tip 2BXa of the first gradation part 2BX and a tip 3BXa of the second gradation part 3BX do not overlap. When the interlayer film 11B is planarly viewed, the distance D of the part between the tip of the first gradation part 2BX and the tip of the second gradation part 3BX is 30 cm or less.

In FIG. 3, the interlayer film 11B is shown in a laminated glass 31B prepared therewith. The laminated glass 31B includes a first lamination glass member 21, a second lamination glass member 22 and the interlayer film 11B. The interlayer film 11B is arranged between the first lamination glass member 21 and the second lamination glass member 22. The first lamination glass member 21 is arranged on a first surface side of the interlayer film 11B to be layered thereon. The second lamination glass member 22 is arranged on a second surface side opposite to the first surface of the interlayer film 11B to be layered thereon.

The interlayer film 11B and the laminated glass 31B have a display part of the back light or brake light 51. The part between the tip 2BXa of the first gradation part 2BX and the tip 3BXa of the second gradation part 3BX is a display part of the back light or brake light 51. The light emitted from the back light or brake light 51 can be visually recognized in a gradation condition in the part between the tip 2BXa of the first gradation part 2BX and the tip 3BXa of the second gradation part 3BX (the narrow part of distance D), and in the vicinity thereof.

FIG. 4 is a sectional view schematically showing an interlayer film for laminated glass and a laminated glass in accordance with a fourth embodiment of the present invention.

An interlayer film 11C shown in FIG. 4 has the configuration A.

The interlayer film 11C is shown in a laminated glass 31C prepared therewith.

The interlayer film 11C has one end 11Ca and the other end 11Cb at the opposite side of the one end 11Ca.

The interlayer film 11C has a transparent part 10, a first colored part 2C, and a second colored part 3C.

The whole of the first colored part 2C is a first gradation part where visible light transmittance increases from the one end 11Ca side toward the other end 11Cb side of the interlayer film 11C. The first gradation part forms a tip of the first colored part 2C on the other end 11Cb side of the interlayer film 11C. The first colored part 2C does not have a non-gradation part on the one end 11Ca side of the interlayer film 11C. The first colored part 2C reaches the one end 11Ca of the interlayer film 11C in the gradation part. The thickness of the first colored part 2C (first gradation part) decreases from the one end 11Ca side toward the other end 11Cb side of the interlayer film 11C.

The whole of the second colored part 3C is a second gradation part where visible light transmittance increases from the other end 11Cb side toward the one end 11Ca side of the interlayer film 11C. The second gradation part forms a tip of the second colored part 3C on the one end 11Ca side of the interlayer film 11C. The second colored part 3C does not have a non-gradation part on the other end 11Cb side of the interlayer film 11C. The second colored part 3C reaches the other end 11Cb of the interlayer film 11C in the gradation part. The thickness of the second colored part 3C (second gradation part) decreases from the other end 11Cb side toward the one end 11Ca side of the interlayer film 11C.

When the interlayer film 11C is planarly viewed, a tip 2Ca of the first colored part 2C (first gradation part) and a tip 3Ca of the second colored part 3C (second gradation part) are located at an identical position.

As with the interlayer film 11C, the whole of the colored part may be a gradation part. Also in the interlayer film including the configuration B and the configuration C, the whole of the colored part may be a gradation part.

FIG. 5 is a sectional view schematically showing an interlayer film for laminated glass and a laminated glass in accordance with a fifth embodiment of the present invention.

An interlayer film 11D shown in FIG. 5 has the configuration A.

The interlayer film 11D is shown in a laminated glass 31D prepared therewith.

The interlayer film 11D has one end 11Da and the other end 11Db at the opposite side of the one end 11Da.

The interlayer film 11D has a transparent part 1D, a first colored part 2D, and a second colored part 3D.

On only one surface side of the first colored part 2D, the transparent part 1D is arranged. The first colored part 2D is not embedded in the transparent part 1D. On only one surface side of the second colored part 3D, the transparent part 1D is arranged. The second colored part 3D is not embedded in the transparent part 1D. The transparent part 1D is a surface layer of the interlayer film 11D. Each of the first colored part 2D and the second colored part 3D is a surface layer of the interlayer film 11D.

The first colored part 2D has a first gradation part 2DX. The first gradation part 2DX forms a tip of the first colored part 2D on the other end 11Db side of the interlayer film 11D. The first colored part 2D has a first non-gradation part 2DY on the one end 11Da side of the interlayer film 11D. The first colored part 2D reaches the one end 11Da of the interlayer film 11D in the first non-gradation part 2DY.

The second colored part 3D has a second gradation part 3DX. The second gradation part 3DX forms a tip of the second colored part 3D on the one end 11Da side of the interlayer film 11D. The second colored part 3D has a second non-gradation part 3DY on the other end 11Db side of the interlayer film 11D. The second colored part 3D reaches the other end 11Db of the interlayer film 11D in the second non-gradation part 3DY.

When the interlayer film 11D is planarly viewed, a tip 2DXa of the first gradation part 2DX and a tip 3DXa of the second gradation part 3DX are located at an identical position.

As with the interlayer film 11D, the colored part need not be embedded in the transparent part, and the colored part may be a surface layer. Also in the interlayer film having the configuration B and the configuration C, the colored part need not be embedded in the transparent part, and the colored part may be a surface layer.

FIG. 6 is a sectional view schematically showing an interlayer film for laminated glass and a laminated glass in accordance with a sixth embodiment of the present invention.

An interlayer film 11E shown in FIG. 6 has the configuration A.

The interlayer film 11E is shown in a laminated glass 31E prepared therewith.

The interlayer film 11E has one end 11Ea and the other end 11Eb at the opposite side of the one end 11Ea.

In FIG. 6, a coloring agent E is schematically shown, and abundance of the coloring agent E is schematically shown. When the coloring agent is particulate, the actual size of the coloring agent is significantly smaller than the size shown in FIG. 6. In FIGS. 1 to 5, 7 and 8, illustration of a coloring agent is omitted.

The interlayer film 11E has a transparent part 1E, a first colored part 2E, and a second colored part 3E.

The first colored part 2E has a first gradation part 2EX. The first gradation part 2EX forms a tip of the first colored part 2E on the other end 11Eb side of the interlayer film 11E. The first colored part 2E has a first non-gradation part 2EY on the one end 11Ea side of the interlayer film 11E. The first colored part 2E reaches the one end 11Ea of the interlayer film 11E in the first non-gradation part 2EY. The first gradation part 2EX is a part where the concentration of the coloring agent decreases from the one end 11Ea side toward the other end 11Eb side of the interlayer film 11E. In the first non-gradation part 2EY, the concentration of the coloring agent is uniform.

The second colored part 3E has a second gradation part 3EX. The second gradation part 3EX forms a tip of the second colored part 3E on the one end 11Ea side of the interlayer film 11E. The second colored part 3E has a second non-gradation part 3EY on the other end 11Eb side of the interlayer film 11E. The second colored part 3E reaches the other end 11Eb of the interlayer film 11E in the second non-gradation part 3EY. The second gradation part 3EX is a part where the concentration of the coloring agent decreases from the other end 11Eb side toward the one end 11Ea side of the interlayer film 11E. In the second non-gradation part 3EY, the concentration of the coloring agent is uniform.

When the interlayer film 11E is planarly viewed, a tip 2EXa of the first gradation part 2EX and a tip 3EXa of the second gradation part 3EX are located at an identical position.

As with the interlayer film 11E, the gradation part may be formed by the variation in concentration of the coloring agent. Also in the interlayer film including the configuration B and the configuration C, the gradation part may be formed by the variation in concentration of the coloring agent.

FIG. 7 is a sectional view schematically showing an interlayer film for laminated glass and a laminated glass in accordance with a seventh embodiment of the present invention.

An interlayer film 11F shown in FIG. 7 has the configuration C.

The interlayer film 11F is shown in a laminated glass 31F prepared therewith.

The interlayer film 11F has one end 11Fa and the other end 11Fb at the opposite side of the one end 11Fa.

The interlayer film 11F has a transparent part 1F, a first colored part 2F, a second colored part 3F, and a third colored part 4F.

The first colored part 2F has a first gradation part 2FX. The first gradation part 2FX forms a tip of the first colored part 2F on the other end 11Fb side of the interlayer film 11F. The first colored part 2F has a first non-gradation part 2FY on the one end 11Fa side of the interlayer film 11F. The first colored part 2F reaches the one end 11Fa of the interlayer film 11F in the first non-gradation part 2FY.

The second colored part 3F has a second gradation part 3FX. The second gradation part 3FX forms a tip of the second colored part 3F on the one end 11Fa side of the interlayer film 11F. The second colored part 3F has a second non-gradation part 3FY on the other end 11Fb side of the interlayer film 11F. The second colored part 3F reaches the other end 11Fb of the interlayer film 11F in the second non-gradation part 3FY.

The third colored part 4F is arranged in a part between a tip of the first gradation part 2FX and a tip of the second gradation part 3FX. The third colored part 4F is a non-gradation part. Since the third colored part 4F is a non-gradation part, the third colored part 4F is not included in the first gradation part 2FX that forms a tip of the first colored part 2F. Since the third colored part 4F is a non-gradation part, the third colored part 4F is not included in the second gradation part 3FX that forms a tip of the second colored part 3F.

When the interlayer film 11F is planarly viewed, a tip 2FXa of the first gradation part 2FX and a tip 3FXa of the second gradation part 3FX do not overlap. When the interlayer film 11F is planarly viewed, the distance D of the part between the tip of the first gradation part 2FX and the tip of the second gradation part 3FX is 30 cm or less.

As with the interlayer film 11F, a colored part may be arranged between the first and second gradation parts.

FIG. 8 is a sectional view schematically showing an interlayer film for laminated glass and a laminated glass in accordance with an eighth embodiment of the present invention.

An interlayer film 11G shown in FIG. 8 has the configuration C.

The interlayer film 11G is shown in a laminated glass 31G prepared therewith.

The interlayer film 11G has one end 11Ga and the other end 11Gb at the opposite side of the one end 11Ga.

The interlayer film 11G has a transparent part 1G, a first colored part 2G, and a second colored part 3G. In the thickness direction of the interlayer film 11G, the first colored part 2G and the second colored part 3G exist at different depth positions.

The first colored part 2G has a first gradation part 2GX. The first gradation part 2GX forms a tip of the first colored part 2G on the other end 11Gb side of the interlayer film 11G. The first colored part 2G has a first non-gradation part 2GY on the one end 11Ga side of the interlayer film 11G. The first colored part 2G reaches the one end 11Ga of the interlayer film 11G in the first non-gradation part 2GY.

The second colored part 3G has a second gradation part 3GX. The second gradation part 3GX forms a tip of the second colored part 3G on the one end 11Ga side of the interlayer film 11G. The second colored part 3G has a second non-gradation part 3GY on the other end 11Gb side of the interlayer film 11G. The second colored part 3G reaches the other end 11Gb of the interlayer film 11G in the second non-gradation part 3GY.

When the interlayer film 11G is planarly viewed, a tip 2GXa of the first gradation part 2GX and a tip 3GXa of the second gradation part 3GX do not overlap. When the interlayer film 11G is planarly viewed, the distance D of the part between the tip of the first gradation part 2GX and the tip of the second gradation part 3GX is 30 cm or less.

As with the interlayer film 11G, the depth positions of the first and second gradation parts may be different in the thickness direction of the interlayer film. Also in the interlayer film having the configuration A, the depth positions of the first and second gradation parts may be different as long as the tip of the first gradation part and the tip of the second gradation part are located at an identical position when the interlayer film is planarly viewed.

FIG. 9 is a plan view schematically showing a laminated glass including an interlayer film for laminated glass in accordance with a ninth embodiment of the present invention.

FIG. 10 is a perspective view schematically showing a laminated glass having an interlayer film for laminated glass in accordance with a tenth embodiment of the present invention.

In FIG. 9 and FIG. 10, the interlayer film is shown in a laminated glass prepared therewith. The parts where the color tone becomes light are the first and second gradation parts. The first and second gradation parts are arranged in line. The first and second gradation parts can be applied as a display part of a back light or brake light. The laminated glass shown in FIG. 10 is rear-roof integrated glass.

Hereinafter, other details of members constituting the laminated glass according to the present invention are described.

(First and Second Lamination Glass Members)

Examples of the first and second lamination glass members include a glass plate, a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. The laminated glass is a laminate provided with a glass plate, and it is preferred that at least one glass plate be used. It is preferred that each of the first and second lamination glass members be a glass plate or a PET (polyethylene terephthalate) film and the laminated glass include at least one glass plate as the first and second lamination glass members. It is especially preferred that both of the first and second lamination glass members be glass plates.

Examples of the glass plate include a sheet of inorganic glass and a sheet of organic glass. Examples of the inorganic glass include float plate glass, heat ray-absorbing plate glass, heat ray-reflecting plate glass, polished plate glass, figured plate glass, net plate glass, wired plate glass, green glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth)acrylate plate, and the like.

Although respective thicknesses of the first lamination glass member and the second lamination glass member are not particularly limited, the thickness is preferably 1 mm or more and preferably 5 mm or less. When the lamination glass member is a glass plate, the thickness of the glass plate is preferably 1 mm or more and is preferably 5 mm or less. When the lamination glass member is a PET film, the thickness of the PET film is preferably 0.03 mm or more and is preferably 0.5 mm or less.

The thickness of the first and second lamination glass members means an average thickness.

(Interlayer Film)

The thickness of the interlayer film is not particularly limited. From the viewpoint of the practical aspect and the viewpoint of sufficiently enhancing the penetration resistance and the flexural rigidity of laminated glass, the thickness of the interlayer film is preferably 0.1 mm or more, more preferably 0.25 mm or more, and is preferably 3 mm or less, more preferably 1.5 mm or less. When the thickness of the interlayer film is the above lower limit or more, the penetration resistance and the flexural rigidity of laminated glass are further enhanced. When the thickness of the interlayer film is the above upper limit or less, the transparency of the interlayer film is further improved.

The thickness of the interlayer film means an average thickness.

Resin:

It is preferred that the interlayer film contain a resin. It is preferred that the transparent part contain a resin. It is preferred that the colored part contain a resin. Examples of the resin include thermosetting resins and thermoplastic resins, and the like. One kind of the resin may be used alone, and two or more kinds thereof may be used in combination.

Examples of the thermoplastic resin include a polyvinyl acetal resin, a polyester resin, an ethylene-vinyl acetate copolymer resin, an ethylene-acrylic acid copolymer resin, a polyurethane resin, a polyvinyl alcohol resin, and an ionomer resin, and the like. Thermoplastic resins other than these may be used.

Plasticizer:

It is preferred that the interlayer film contain a plasticizer. It is preferred that the transparent part contain a plasticizer. It is preferred that the colored part contain a plasticizer. When the thermoplastic resin contained in the interlayer film is a polyvinyl acetal resin, it is especially preferred that the interlayer film (the respective layers) contain a plasticizer. One kind of the plasticizer may be used alone and two or more kinds thereof may be used in combination.

Examples of the plasticizer include organic ester plasticizers such as a monobasic organic acid ester and a polybasic organic acid ester, organic phosphate plasticizers such as an organic phosphate plasticizer and an organic phosphite plasticizer, and the like. Organic ester plasticizers are preferred. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decylic acid, benzoic acid and the like.

Examples of the polybasic organic acid ester include an ester compound of a polybasic organic acid and an alcohol having a linear or branched structure of 4 to 8 carbon atoms. Examples of the polybasic organic acid include adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, diethylene glycol dibenzoate, dipropylene glycol dibenzoate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, triisopropyl phosphate, and the like.

It is preferred that the plasticizer be a diester plasticizer represented by the following formula (1).

[Chemical 1]

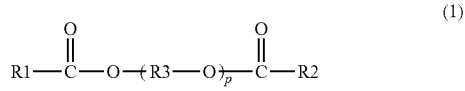

(1)

In the foregoing formula (1), R1 and R2 each represent an organic group with 5 to 10 carbon atoms, R3 represents an ethylene group, an isopropylene group, or an n-propylene group, and p represents an integer of 3 to 10. It is preferred that R1 and R2 in the foregoing formula (1) each be an organic group with 6 to 10 carbon atoms.

It is preferred that the plasticizer include triethylene glycol di-2-ethylhexanoate (3GO), triethylene glycol di-2-ethylbutyrate (3GH) or triethylene glycol di-2-ethylpropanoate. It is more preferred that the plasticizer include triethylene glycol di-2-ethylhexanoate (3GO) or triethylene glycol di-2-ethylbutyrate (3GH), and it is further preferred that the plasticizer include triethylene glycol di-2-ethylhexanoate.

In the interlayer film, a content of the plasticizer relative to 100 parts by weight of the resin (when the resin is thermoplastic resin, 100 parts by weight of the thermoplastic resin; when the resin is polyvinyl acetal resin, 100 parts by weight of the polyvinyl acetal resin) is referred to as content (0). The content (0) is preferably 25 parts by weight or more, more preferably 30 parts by weight or more, and is preferably 100 parts by weight or less, more preferably 60 parts by weight or less, further preferably 50 parts by weight or less. When the content (0) is the above lower limit or more, the penetration resistance of laminated glass is further enhanced. When the content (0) is the above upper limit or less, the transparency of the interlayer film is further enhanced.

Coloring Agent:

The first colored part usually contains a coloring agent. Examples of the coloring agent include inorganic particles, a pigment, a dye and the like. The second colored part usually contains a coloring agent. Examples of the coloring agent include inorganic particles, a pigment, a dye and the like.

Examples of the inorganic particles include carbon black particles, iron oxide particles, zinc oxide particles, calcium carbonate particles, alumina particles, kaolin clay particles, calcium silicate particles, magnesium oxide particles, magnesium hydroxide particles, aluminum hydroxide particles, magnesium carbonate particles, talc particles, feldspar powder particles, mica particles, barite particles, barium carbonate particles, titanium oxide particles, silica particles, and glass beads, and the like. One kind of the inorganic particles may be used alone, and two or more kinds thereof may be used in combination.

The inorganic particles include, preferably carbon black particles, calcium carbonate particles, titanium oxide particles or silica particles, more preferably carbon black particles or calcium carbonate particles, further preferably carbon black particles. By using these preferred inorganic particles, unevenness in appearance is suppressed when the light penetrates, and laminated glass having still further excellent unity of appearance is obtained.

The average particle diameter of the inorganic particles is preferably 1 μm or more, and is preferably 100 μm or less, more preferably 50 μm or less. The average particle diameter refers to the weight average particle diameter. The average particle diameter can be measured by a dynamic light scattering method with a light scattering measuring device and Ar laser as a light source. Examples of the light scattering measuring device include "DLS-6000AL" available from OTSUKA ELECTRONICS Co., LTD., and the like.

Examples of the dye include a pyrene-based dye, an aminoketone-based dye, an anthraquinone-based dye, and an azo-based dye, and the like. One kind of the dye may be used alone, and two or more kinds thereof may be used in combination.

Examples of the pyrene-based dye include Solvent Green (CAS79869-59-3) and Solvent Green 7 (CAS6358-69-6), and the like.

Examples of the aminoketone-based dye include Solvent Yellow 98 (CAS12671-74-8), Solvent Yellow 85 (CAS12271-01-1) and Solvent Red 179 (CAS8910-94-5), and Solvent Red 135 (CAS71902-17-5), and the like.

Examples of the anthraquinone-based dye include Solvent Yellow 163 (CAS13676091-0), Solvent Red 207 (CAS15958-69-6), Disperse Red 92 (CAS12236-11-2), Solvent Violet 13 (CAS81-48-1), Disperse Violet 31 (CAS6408-72-6), Solvent Blue 97 (CAS61969-44-6), Solvent Blue 45 (CAS37229-23-5), Solvent Blue 104 (CAS116-75-6) and Disperse Blue 214 (CAS104491-84-1), and the like.

Examples of the azo-based dye include Solvent Yellow 30 (CAS3321-10-4), Solvent Red 164 (CAS70956-30-8), and Disperse Blue 146 (CAS88650-91-3), and the like.

The pigment may be an organic pigment and may be an inorganic pigment. The organic pigment may be an organic pigment having a metal atom, and may be an organic pigment not having a metal atom. One kind of the pigment may be used alone, and two or more kinds thereof may be used in combination.

Examples of the organic pigment include a phthalocyanine compound, a quinacridone compound, an azo compound, a pentaphene compound, a perylene compound, an indole compound and a dioxazine compound, and the like.

Examples of the inorganic pigment include carbon black, and iron oxide, zinc oxide and titanium oxide, and the like.

It is more preferred that the inorganic pigment include carbon black. By using carbon black, unevenness in appearance is suppressed when the light penetrates, and laminated glass having still further excellent unity of appearance is obtained.

It is more preferred that the colored part contain calcium carbonate particles, titanium oxide particles, silica particles or carbon black. By using carbon black, unevenness in appearance is suppressed when the light penetrates, and laminated glass having still further excellent unity of appearance is obtained.

Other Ingredients:

Each of the interlayer film, the transparent part, and the colored part may contain additives such as heat shielding particles, a light shielding agent, a coloring agent, a UV absorber, an oxidation inhibitor, an adhesive force adjusting agent, a light stabilizer, a flame retarder, an antistatic agent, a moisture-proof agent, a heat rays reflector and a heat rays absorber, and the like, as necessary. One kind of the additives may be used alone and two or more kinds thereof may be used in combination.

Hereinafter, the present invention will be described in more detail with reference to examples. The present invention is not limited only to the following examples.

Examples 1 to 14 and Comparative Examples 1 and 2

Preparation of Composition for Forming Transparent Part:

One hundred parts by weight of a polyvinyl butyral resin, and 40 parts by weight of a plasticizer (3GO) were mixed and sufficiently kneaded with a mixing roll to obtain a composition for forming a transparent part.

Preparation of Composition for Forming First Colored Part and Second Colored Part:

One hundred parts by weight of a polyvinyl butyral resin, 40 parts by weight of a plasticizer (3GO), and a coloring agent of the kind shown in the following Tables 1 and 2 were mixed and sufficiently kneaded with a mixing roll to obtain a composition for forming first and second colored parts. The mixing amount of the coloring agent was the mixing amount shown in Table 1, and the thicknesses of the transparent part, the first colored part and the second colored part were set so that the visible light transmittance of the obtained laminated glass was the value as shown in the following Tables 1 and 2.

Preparation of Interlayer Film:

An interlayer film having a configuration shown in the following Tables 1 and 2 (the configuration A, the configuration B, the configuration C, or other configuration) was prepared. The distance in the direction connecting the one end and the other end of the interlayer film (length in the width direction) was set as shown in the following Tables 1 and 2. The distance in the direction perpendicular to the direction connecting the one end and the other end of the interlayer film (width direction) was 50 cm.

The composition for forming a transparent part, and the composition for forming a first colored part and a second colored part were coextruded by using a co-extruder, to obtain an interlayer film. In the planar direction of the interlayer film, the length of the first non-gradation part in the first colored part, the length of the first gradation part in the first colored part, the length of the second non-gradation part in the second colored part, and the length of the second gradation part in the second colored part were set as shown in the following Tables 1 and 2. In the interlayer film including the configuration B or the like, the obtained interlayer film may be sliced in the thickness direction, and the cross section in the thickness direction of the obtained interlayer film may be exposed, and the lengths of the first and second non-gradation parts, and the lengths of the first and second gradation parts may be measured.

In Comparative Example 1, a first colored part was formed, but a second colored part was not formed. The interlayer film of Comparative Example 1 does not include the configuration A, the configuration B, or the configuration C, and includes other configuration. In Comparative Example 2, the first colored part and the second colored part were formed, and a configuration similar to the configuration C was employed, and the distance D was 50 cm. The interlayer film of Comparative Example 2 does not include the configuration A, the configuration B, and the configuration C, but includes a configuration similar to the configuration C (the distance D is more than 30 cm) as other configuration.

Therefore, the interlayer films of Examples 1 to 14 and Comparative Examples 1 and 2 have a part where visible light transmittance increases from the one end side toward the other end side of the interlayer film, as the first gradation part. The interlayer films of Examples 1 to 14 and Comparative Example 2 have a part where visible light transmittance increases from the other end side toward the one end side of the interlayer film, as the second gradation part.

Preparation of Laminated Glass:

Two sheets of green glass in conformity with JIS R3208 (2 mm in thickness, 100 cm in length, 50 cm in width) were prepared. Between these two sheets of green glass, the obtained interlayer film was sandwiched so that the longitudinal direction of the green glass coincided with the direction connecting the one end and the other end of the interlayer film, and the transverse direction of the green glass coincided with the direction perpendicular to the direction connecting the one end and the other end of the interlayer film. Then, the resultant laminate was retained at 90° C. for 30 minutes and vacuum-pressed with a vacuum laminator, to obtain a laminated glass. When the distance in the direction connecting the one end and the other end of the interlayer film (length in the width direction) is more than 1 m, a laminated glass was obtained in the following manner. In the interlayer film including the configuration A, the obtained interlayer film was sandwiched between the two sheets of green glass so that the tip of the first gradation part and the tip of the second gradation part were located in the center of the longitudinal direction of the green glass. In the interlayer film including the configuration B, the configuration C, or other configuration, the obtained interlayer film was sandwiched between the two sheets of green glass so that a position at equal distances from the tip of the first gradation part and the tip of the second gradation part was located in the center of the longitudinal direction of the green glass. Further, the interlayer film protruding from the green glass was cut off to obtain a laminated glass.

(Evaluation)

(1) Visible Light Transmittance

The visible light transmittance (Visible Transmittance) at a wavelength ranging from 380 to 780 nm of the obtained laminated glass was measured by using a spectrophotometer ("U-4100" available from Hitachi High-Tech Corporation) in conformity with JIS R3106:1998.

For each obtained laminated glass, the value of the visible light transmittance is shown in the following Tables 1 and 2.
1) Visible light transmittance of first non-gradation part in first colored part
2) Visible light transmittance of second non-gradation part in second colored part
3) Percentage of plane area of part having visible light transmittance of 60% or less, in 100% of total plane area of laminated glass
4) Visible light transmittance of part having maximum visible light transmittance in entire laminated glass (2) Unity of Appearance A laminated glass was placed at an angle of 30 degrees with respect to the horizontal direction. Twenty evaluators visually observed the entire laminated glass at a distance of 3 m, and judged the unity of appearance according to the following criteria. The number of evaluators who judged as ○ was shown in Tables 1 and 2.

[Criteria for Judgment in Unity of Appearance]
○ (good): The laminated glass is visually recognized as having unity in the gradation part and the vicinity (both sides) thereof.
x (bad): The laminated glass is not visually recognized as having unity in the gradation part and the vicinity (both sides) thereof.

(3) Display Visibility of Light

A laminated glass was placed at an angle of 30° C. degrees. The laminated glass was irradiated with light of an LED light while the irradiation site was shifted from the one end toward the other end of the laminated glass. Twenty evaluators visually observed the laminated glass being irradiated with the light at a distance of 3 m, and judged the display visibility of light according to the following criteria. The number of evaluators who judged as ○ was shown in Tables 1 and 2.

[Criteria for Judgment in Display Visibility of Light]
○ (good): The light is well visually recognized in the gradation part and the vicinity (both sides) thereof.
x (bad): The light is difficult to be visually recognized in the gradation part and the vicinity (both sides) thereof.

The details and the results are shown in the following Tables 1, 2.

TABLE 1

| | | Example 1 | Example 2 | Example 3 | Example 4 |
|---|---|---|---|---|---|
| Configuration of interlayer film | Corresponding FIG. No. | FIG. 1 | FIG. 1 | FIG. 1 | FIG. 1 |
| | Kind of configuration (configuration A, configuration B, configuration C, other configuration) | A | A | A | A |
| | Distance D in configuration C or in configuration similar to configuration C (cm) | — | — | — | — |
| | Percentage of plane area of part where at least one of first colored part and second colored part exist in 100% of total plane area of interlayer film (%) | 100 | 100 | 100 | 100 |
| | Length in width direction (cm) | 300 | 300 | 300 | 300 |
| Transparent part | Kind of coloring agent | — | — | — | — |
| First colored part | Kind of coloring agent | Carbon black | Carbon black | Carbon black | Carbon black |
| | Content of coloring agent per 100 parts by weight of polyvinyl butyral resin (parts by weight) | 0.044 | 0.044 | 0.044 | 0.044 |
| | Length of first gradation part (cm) | 20 | 20 | 20 | 20 |
| | Length of first non-gradation part (cm) | 130 | 130 | 130 | 130 |
| Second colored part | Kind of coloring agent | Carbon black | Carbon black | Carbon black | Carbon black |
| | Content of coloring agent per 100 parts by weight of polyvinyl butyral resin (parts by weight) | 0.044 | 0.044 | 0.044 | 0.044 |
| | Length of second gradation part (cm) | 20 | 20 | 20 | 20 |
| | Length of second non-gradation part (cm) | 130 | 130 | 130 | 130 |
| 1) Visible light transmittance of first non-gradation part in first colored part (%) | | 2 | 2 | 2 | 2 |
| 2) Visible light transmittance of second non-gradation part in second colored part (%) | | 2 | 2 | 2 | 2 |
| 3) Percentage of plane area of part having visible light transmittance of 60% or less, in 100% of total plane area of laminated glass (%) | | 100 | 100 | 100 | 100 |
| 4) Visible light transmittance of part having maximum visible light transmittance in entire laminated glass (%) | | 60 | 40 | 20 | 10 |

TABLE 1-continued

| | | | | | |
|---|---|---|---|---|---|
| Unity of appearance<br>Number of evaluators judging as ○ (good) among 20 evaluators | 10 | 18 | 20 | 20 | |
| Display visibility of light<br>Number of evaluators judging as ○ (good) among 20 evaluators | 20 | 20 | 18 | 14 | |

| | | Example 5 | Example 6 | Example 7 | Example 8 |
|---|---|---|---|---|---|
| Configuration of interlayer film | Corresponding FIG. No. | FIG. 1 | FIG. 1 | FIG. 2 | FIG. 3 |
| | Kind of configuration (configuration A, configuration B, configuration C, other configuration) | A | A | B | C |
| | Distance D in configuration C or in configuration similar to configuration C (cm) | — | — | — | 30 |
| | Percentage of plane area of part where at least one of first colored part and second colored part exist in 100% of total plane area of interlayer film (%) | 100 | 100 | 100 | 70 |
| | Length in width direction (cm) | 200 | 100 | 100 | 100 |
| Transparent part | Kind of coloring agent | — | — | — | Carbon black |
| First colored part | Kind of coloring agent | Carbon black | Carbon black | Carbon black | Carbon black |
| | Content of coloring agent per 100 parts by weight of polyvinyl butyral resin (parts by weight) | 0.044 | 0.044 | 0.044 | 0.044 |
| | Length of first gradation part (cm) | 15 | 10 | 20 | 15 |
| | Length of first non-gradation part (cm) | 85 | 40 | 40 | 20 |
| Second colored part | Kind of coloring agent | Carbon black | Carbon black | Carbon black | Carbon black |
| | Content of coloring agent per 100 parts by weight of polyvinyl butyral resin (parts by weight) | 0.044 | 0.044 | 0.044 | 0.044 |
| | Length of second gradation part (cm) | 15 | 10 | 20 | 15 |
| | Length of second non-gradation part (cm) | 85 | 40 | 40 | 20 |
| 1) Visible light transmittance of first non-gradation part in first colored part (%) | | 2 | 2 | 2 | 2 |
| 2) Visible light transmittance of second non-gradation part in second colored part (%) | | 2 | 2 | 2 | 2 |
| 3) Percentage of plane area of part having visible light transmittance of 60% or less, in 100% of total plane area of laminated glass (%) | | 100 | 100 | 100 | 70 |
| 4) Visible light transmittance of part having maximum visible light transmittance in entire laminated glass (%) | | 40 | 40 | 40 | 70 |
| Unity of appearance<br>Number of evaluators judging as ○ (good) among 20 evaluators | | 18 | 18 | 18 | 7 |
| Display visibility of light<br>Number of evaluators judging as ○ (good) among 20 evaluators | | 20 | 20 | 20 | 20 |

TABLE 2

| | | Example 9 | Example 10 | Example 11 | Example 12 |
|---|---|---|---|---|---|
| Configuration of interlayer film | Corresponding FIG. No. | FIG. 3 | FIG. 3 | FIG. 1 | FIG. 1 |
| | Kind of configuration (configuration A, configuration B, configuration C, other configuration) | C | C | A | A |
| | Distance D in configuration C or in configuration similar to configuration C (cm) | 10 | 5 | — | — |
| | Percentage of plane area of part where at least one of first colored part and second colored part exist in 100% of total plane area of interlayer film (%) | 90 | 95 | 100 | 100 |
| | Length in width direction (cm) | 100 | 100 | 300 | 300 |
| Transparent part | Kind of coloring agent | Carbon black | Carbon black | — | — |
| First colored part | Kind of coloring agent | Carbon black | Carbon black | Carbon black | Carbon black |
| | Content of coloring agent per 100 parts by weight of polyvinyl butyral resin (parts by weight) | 0.044 | 0.044 | 0.038 | 0.038 |
| | Length of first gradation part (cm) | 15 | 17.5 | 20 | 20 |
| | Length of first non-gradation part (cm) | 30 | 30 | 130 | 130 |

TABLE 2-continued

| | | | | | |
|---|---|---|---|---|---|
| Second colored part | Kind of coloring agent | Carbon black | Carbon black | Carbon black | Carbon black |
| | Content of coloring agent per 100 parts by weight of polyvinyl butyral resin (parts by weight) | 0.044 | 0.044 | 0.038 | 0.038 |
| | Length of second gradation part (cm) | 15 | 17.5 | 20 | 20 |
| | Length of second non-gradation part (cm) | 30 | 30 | 130 | 130 |
| 1) Visible light transmittance of first non-gradation part in first colored part (%) | | 2 | 2 | 4 | 4 |
| 2) Visible light transmittance of second non-gradation part in second colored part (%) | | 2 | 2 | 4 | 4 |
| 3) Percentage of plane area of part having visible light transmittance of 60% or less, in 100% of total plane area of laminated glass (%) | | 90 | 95 | 100 | 100 |
| 4) Visible light transmittance of part having maximum visible light transmittance in entire laminated glass (%) | | 70 | 70 | 60 | 40 |
| Unity of appearance Number of evaluators judging as ○ (good) among 20 evaluators | | 9 | 11 | 10 | 18 |
| Display visibility of light Number of evaluators judging as ○ (good) among 20 evaluators | | 20 | 20 | 20 | 20 |

| | | Example 13 | Example 14 | Comparative Example 1 | Comparative Example 2 |
|---|---|---|---|---|---|
| Configuration of interlayer film | Corresponding FIG. No. | FIG. 1 | FIG. 1 | FIG. 11 | Similar to FIG. 3 |
| | Kind of configuration (configuration A, configuration B, configuration C, other configuration) | A | A | Other | Other (similar to C) |
| | Distance D in configuration C or in configuration similar to configuration C (cm) | — | — | — | 50 |
| | Percentage of plane area of part where at least one of first colored part and second colored part exist in 100% of total plane area of interlayer film (%) | 100 | 100 | 50 | 50 |
| | Length in width direction (cm) | 300 | 300 | 300 | 100 |
| Transparent part | Kind of coloring agent | — | — | Carbon black | Carbon black |
| First colored part | Kind of coloring agent | Carbon black | Carbon black | Carbon black | Carbon black |
| | Content of coloring agent per 100 parts by weight of polyvinyl butyral resin (parts by weight) | 0.033 | 0.033 | 0.044 | 0.044 |
| | Length of first gradation part (cm) | 20 | 20 | 20 | 10 |
| | Length of first non-gradation part (cm) | 130 | 130 | 130 | 15 |
| Second colored part | Kind of coloring agent | Carbon black | Carbon black | — | Carbon black |
| | Content of coloring agent per 100 parts by weight of polyvinyl butyral resin (parts by weight) | 0.033 | 0.033 | — | 0.044 |
| | Length of second gradation part (cm) | 20 | 20 | — | 10 |
| | Length of second non-gradation part (cm) | 130 | 130 | — | 15 |
| 1) Visible light transmittance of first non-gradation part in first colored part (%) | | 6 | 6 | 2 | 2 |
| 2) Visible light transmittance of second non-gradation part in second colored part (%) | | 6 | 6 | — | 2 |
| 3) Percentage of plane area of part having visible light transmittance of 60% or less, in 100% of total plane area of laminated glass (%) | | 100 | 100 | 50 | 50 |
| 4) Visible light transmittance of part having maximum visible light transmittance in entire laminated glass (%) | | 20 | 10 | 70 | 50 |
| Unity of appearance Number of evaluators judging as ○ (good) among 20 evaluators | | 20 | 20 | 0 | 0 |
| Display visibility of light Number of evaluators judging as ○ (good) among 20 evaluators | | 18 | 14 | 20 | 20 |

Laminated glasses obtained in Examples 1 to 14 were excellent in unity of appearance. Laminated glasses obtained in Examples 1 to 14 were also excellent in display visibility of light. In Examples 1 to 14, a polyvinyl acetal resin was used as the resin, and carbon black was used as the coloring agent, however, excellent unity of appearance is exerted as long as the configuration according to the present invention is satisfied even if a resin other than the polyvinyl acetal resin and a coloring agent other than carbon black are used.

EXPLANATION OF SYMBOLS 1, 1A, 1B, 1C, 1D, 1E, 1F, 1G: Transparent part
2, 2A, 2B, 2D, 2E, 2F, 2G: First colored part
2C: First colored part (first gradation part)
2X, 2AX, 2BX, 2DX, 2EX, 2FX, 2GX: First gradation part
2Xa, 2AXa, 2BXa, 2DXa, 2EXa, 2FXa, 2GXa: Tip
2Ca: Tip
2Y, 2AY, 2BY, 2DY, 2EY, 2FY, 2GY: First non-gradation part
3, 3A, 3B, 3D, 3E, 3F, 3G: Second colored part
3C: Second colored part (second gradation part)
3X, 3AX, 3BX, 3DX, 3EX, 3FX, 3GX: Second gradation part
3Xa, 3AXa, 3BXa, 3DXa, 3EXa, 3FXa, 3GXa: Tip
3Ca: Tip
3Y, 3AY, 3BY, 3DY, 3EY, 3FY, 3GY: Second non-gradation part
4F: Third colored part
11, 11A, 11B, 11C, 11D, 11E, 11F, 11G: Interlayer film
11a, 11Aa, 11Ba, 11Ca, 11Da, 11Ea, 11Fa, 11Ga: One end
11b, 11Ab, 11Bb, 11Cb, 11Db, 11Eb, 11Fb, 11Gb: Other end
21: First lamination glass member
22: Second lamination glass member
31, 31A, 31B, 31C, 31D, 31E, 31F, 31G: Laminated glass
51: Back light or brake light
E: Coloring agent

The invention claimed is:

1. An interlayer film for laminated glass, comprising:
one end; and an other end at an opposite side of the one end,
the interlayer film comprising:
a first colored part containing a coloring agent; and a second colored part containing a coloring agent,
the first colored part including a part located closer to the one end of the interlayer film than the second colored part, the second colored part including a part located closer to the other end of the interlayer film than the first colored part,
the first colored part having a first gradation part where visible light transmittance increases from the one end side toward the other end side of the interlayer film, the first gradation part forming a tip of the first colored part on the other end side of the interlayer film,
the second colored part having a second gradation part where visible light transmittance increases from the other end side toward the one end side of the interlayer film, the second gradation part forming a tip of the second colored part on the one end side of the interlayer film,
wherein when the interlayer film is planarly viewed, a plane area of a part where at least one of the first colored part and the second colored part exists is 80% or more in 100% of a total plane area of the interlayer film, and
wherein the interlayer film has a configuration A, B or C below:
the configuration A being that when the interlayer film is planarly viewed, the tip of the first gradation part and the tip of the second gradation part are located at an identical position,
the configuration B being that when the interlayer film is planarly viewed, there is a region where the first gradation part and the second gradation part overlap, and
the configuration C being that when the interlayer film is planarly viewed, the first gradation part and the second gradation part do not overlap, and being that when the interlayer film is planarly viewed, a distance of a part between the tip of the first gradation part and the tip of the second gradation part is more than 0 cm and 30 cm or less.

2. The interlayer film for laminated glass according to claim 1, wherein when a laminated glass is obtained by sandwiching the interlayer film for laminated glass between two sheets of green glass in conformity with JIS R3208 and having a thickness of 2 mm, a plane area of a part having visible light transmittance of 60% or less is 80% or more in 100% of a total plane area of the laminated glass.

3. The interlayer film for laminated glass according to claim 1, wherein when a laminated glass is obtained by sandwiching the interlayer film for laminated glass between two sheets of green glass in conformity with JIS R3208 and having a thickness of 2 mm, visible light transmittance of a part having maximum visible light transmittance in an entire laminated glass is 60% or less.

4. The interlayer film for laminated glass according to claim 1, wherein
the first colored part reaches the one end of the interlayer film, and
the second colored part reaches the other end of the interlayer film.

5. The interlayer film for laminated glass according to claim 1, comprising:
a transparent part arranged on at least one surface side of the first colored part in a thickness direction of the interlayer film; and
a transparent part arranged on at least one surface side of the second colored part in the thickness direction of the interlayer film.

6. The interlayer film for laminated glass according to claim 1, which is an interlayer film for laminated glass to be capable of being used in a back light or brake light display part.

7. The interlayer film for laminated glass according to claim 1, which is capable of being used in rear glass, roof glass, or rear-roof integrated glass.

8. The interlayer film for laminated glass according to claim 1, wherein the interlayer film has the configuration A.

9. The interlayer film for laminated glass according to claim 1, wherein the interlayer film has the configuration B.

10. A laminated glass comprising:
a first lamination glass member;
a second lamination glass member; and
the interlayer film for laminated glass according to claim 1,
the interlayer film for laminated glass being arranged between the first lamination glass member and the second lamination glass member.

11. The laminated glass according to claim 10, wherein a plane area of a part having visible light transmittance of 60% or less is 80% or more in 100% of a total plane area of the laminated glass.

12. The laminated glass according to claim 10, wherein visible light transmittance of a part having maximum visible light transmittance is 60% or less in the entire laminated glass.

13. An automobile comprising:
an automobile body; and
a laminated glass as window glass of the automobile,
the laminated glass including a first lamination glass member, a second lamination glass member, and the interlayer film for laminated glass according to claim 1,
the interlayer film for laminated glass being arranged between the first lamination glass member and the second lamination glass member.

14. The automobile according to claim 13, comprising a back light or a brake light, wherein
when the interlayer film has the configuration A, a part where the tip of the first gradation part and the tip of the second gradation part are located at an identical position is a display part of the back light or the brake light;
when the interlayer film has the configuration B, the region where the first gradation part and the second gradation part overlap is a display part of the back light or the brake light; and
when the interlayer film has the configuration C, the part between the tip of the first gradation part and the tip of the second gradation part is a display part of the back light or the brake light.

15. The interlayer film for laminated glass according to claim 1, wherein the interlayer film has the configuration C.

16. The interlayer film for laminated glass according to claim 1, wherein the first colored part has a first non-gradation part on the one end side of the interlayer film, and the second colored part has a second non-gradation part on the other end side of the interlayer film, and
wherein a length of the first gradation part is 10 cm or more and 20 cm or less, a length of the second gradation part is 10 cm or more and 20 cm or less, a length of the first non-gradation part is 20 cm or more and 130 cm or less, and a length of the second non-gradation part is 20 cm or more and 130 cm or less.

\* \* \* \* \*